US011229963B2

(12) United States Patent
Mougeotte et al.

(10) Patent No.: US 11,229,963 B2
(45) Date of Patent: Jan. 25, 2022

(54) FORCE AND MOMENT CANCELING RECIPROCATING MECHANISM AND POWER TOOL HAVING SAME

(71) Applicant: Black & Decker Inc., Newark, DE (US)

(72) Inventors: Christopher S. Mougeotte, Reistertown, MD (US); David C. Tomayko, Ellicott City, MD (US); Bryce Yapps, Baltimore, MD (US)

(73) Assignee: Black & Decker Inc., New Britain, CT (US)

( * ) Notice: Subject to any disclaimer, the term of this patent is extended or adjusted under 35 U.S.C. 154(b) by 71 days.

(21) Appl. No.: 16/450,504

(22) Filed: Jun. 24, 2019

(65) Prior Publication Data

US 2020/0398355 A1 Dec. 24, 2020

(51) Int. Cl.
| | |
|---|---|
| *B23D 51/10* | (2006.01) |
| *B23D 51/16* | (2006.01) |
| *B25F 5/00* | (2006.01) |
| *B23Q 5/38* | (2006.01) |
| *B27B 3/26* | (2006.01) |

(52) U.S. Cl.
CPC ........... *B23D 51/10* (2013.01); *B23D 51/166* (2013.01); *B23Q 5/385* (2013.01); *B25F 5/001* (2013.01); *B27B 3/26* (2013.01)

(58) Field of Classification Search
CPC ...... B23D 51/10; B23D 51/166; B23D 51/01; B23Q 5/385; B25F 5/001; B27B 3/26; F16F 15/265; F16H 21/36
USPC ................................................. 173/140, 213
See application file for complete search history.

(56) References Cited

U.S. PATENT DOCUMENTS

| 1,525,070 A | * | 2/1925 | Coleman | F16H 33/185 |
| | | | | 475/248 |
| 2,931,402 A | * | 4/1960 | Papworth | B23D 49/165 |
| | | | | 30/393 |
| 3,205,721 A | * | 9/1965 | Speer | B23D 51/025 |
| | | | | 74/50 |
| 3,655,021 A | * | 4/1972 | Froio | B65G 13/075 |
| | | | | 193/35 A |

(Continued)

FOREIGN PATENT DOCUMENTS

EP 1980351 A2 10/2008

*Primary Examiner* — Robert F Long
(74) *Attorney, Agent, or Firm* — Michael Aronoff

(57) ABSTRACT

A force and moment canceling reciprocating mechanism for a power-driven tool may include a transmission including an input gear assembly and an output gear assembly, coupled to a reciprocating mechanism. The input gear assembly may include a first input gear coaxially aligned with a second input gear. The output gear assembly may include a first output gear coaxially arranged with a second output gear. The reciprocating mechanism may be coupled to the output gear assembly, to convert rotational motion to linear motion, for output to an output accessory of the tool. One or both of the first and second input gears may include counterweights, or counterweight masses, and one or both of the first and second output gears may include counterweights, or counterweight masses. The counterweighting of the input and output gear assemblies may provide for the cancelation of forces and moments generated by the operation of the motor and the transmission, and the reciprocal motion of the reciprocating mechanism.

20 Claims, 27 Drawing Sheets

(56) References Cited

U.S. PATENT DOCUMENTS

| | | | | |
|---|---|---|---|---|
| 3,766,362 | A * | 10/1973 | Pell | G06C 15/00 235/61 E |
| 3,978,862 | A * | 9/1976 | Morrison | B23D 49/165 606/178 |
| 4,482,042 | A * | 11/1984 | Siska | B65G 13/075 188/187 |
| 5,212,887 | A * | 5/1993 | Farmerie | B23D 49/165 30/392 |
| 5,561,909 | A * | 10/1996 | Berg | B23D 49/16 30/277.4 |
| 6,634,437 | B1 * | 10/2003 | Rudolph | B23Q 11/0046 173/1 |
| 6,860,886 | B1 * | 3/2005 | Lee | A61B 17/144 606/82 |
| 8,407,902 | B2 | 4/2013 | Naughton et al. | |
| 9,579,735 | B2 * | 2/2017 | Wattenbach | F16J 15/3232 |
| 10,144,106 | B2 * | 12/2018 | McLain | B24B 47/10 |
| 2004/0194987 | A1 * | 10/2004 | Hanke | B25D 17/06 173/201 |
| 2006/0124331 | A1 * | 6/2006 | Stirm | F16D 43/208 173/178 |
| 2007/0017684 | A1 * | 1/2007 | Stirm | B25D 11/062 173/109 |
| 2007/0135803 | A1 * | 6/2007 | Belson | A61B 1/00128 606/1 |
| 2008/0251568 | A1 * | 10/2008 | Zemlok | A61B 17/068 227/175.1 |
| 2008/0287944 | A1 * | 11/2008 | Pearson | A61B 18/1477 606/41 |
| 2008/0289843 | A1 * | 11/2008 | Townsan | B25B 21/00 173/216 |
| 2008/0308602 | A1 * | 12/2008 | Timm | A61B 17/07207 227/175.1 |
| 2008/0308606 | A1 * | 12/2008 | Timm | A61B 17/07207 227/175.2 |
| 2008/0308607 | A1 * | 12/2008 | Timm | A61B 17/07207 227/176.1 |
| 2010/0162579 | A1 * | 7/2010 | Naughton | B23D 49/16 30/392 |
| 2010/0320252 | A1 * | 12/2010 | Viola | A61B 17/07207 227/176.1 |
| 2011/0139475 | A1 * | 6/2011 | Braun | F16N 11/08 173/112 |
| 2011/0315413 | A1 * | 12/2011 | Fisher | B25F 5/00 173/1 |
| 2012/0261153 | A1 * | 10/2012 | Aoki | B25D 17/24 173/162.1 |
| 2013/0062090 | A1 * | 3/2013 | Winnard | B25B 17/00 173/216 |
| 2013/0199812 | A1 * | 8/2013 | Dangelmaier | F02D 37/02 173/179 |
| 2013/0247391 | A1 * | 9/2013 | Armstrong | B23D 49/003 30/392 |
| 2014/0171966 | A1 * | 6/2014 | Giordano | A61B 17/068 606/130 |
| 2014/0299345 | A1 * | 10/2014 | McRoberts | B25F 5/006 173/162.2 |
| 2015/0136433 | A1 * | 5/2015 | Nitsche | B25D 11/005 173/2 |
| 2019/0061081 | A1 * | 2/2019 | Schaer | B25D 16/00 |
| 2020/0063827 | A1 * | 2/2020 | Courtial | F02B 75/20 |

* cited by examiner

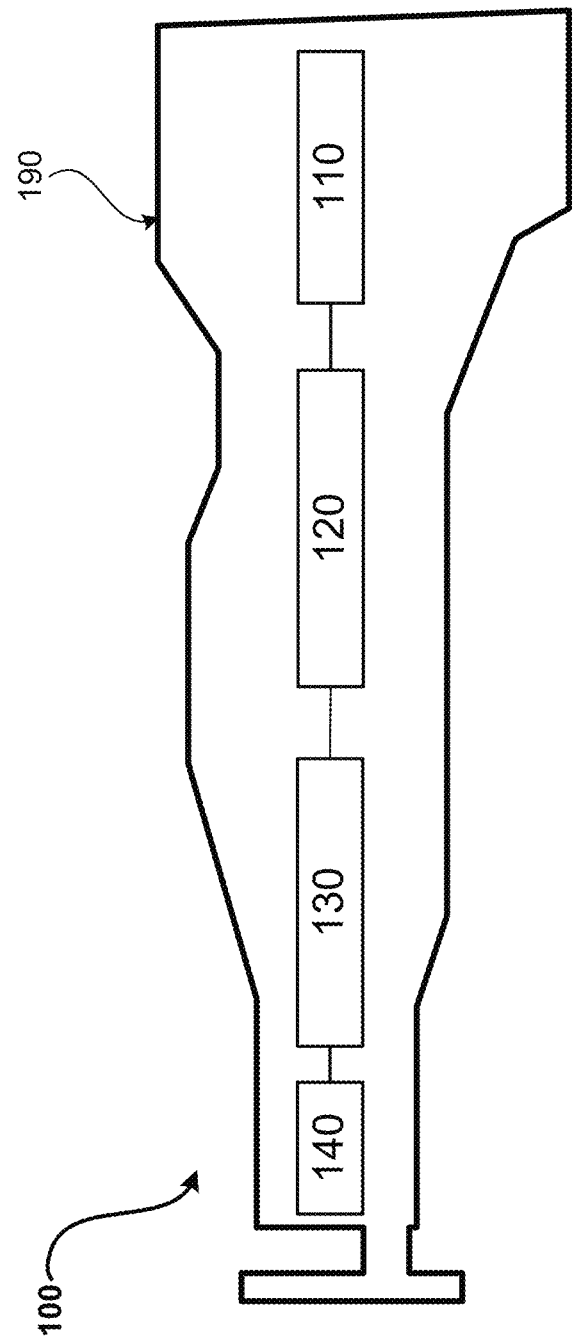

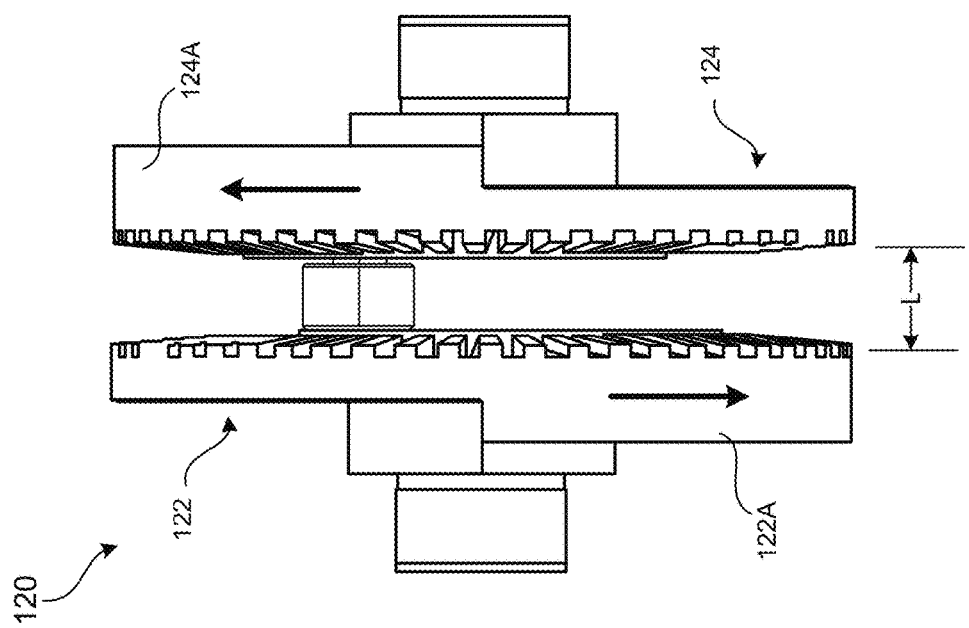

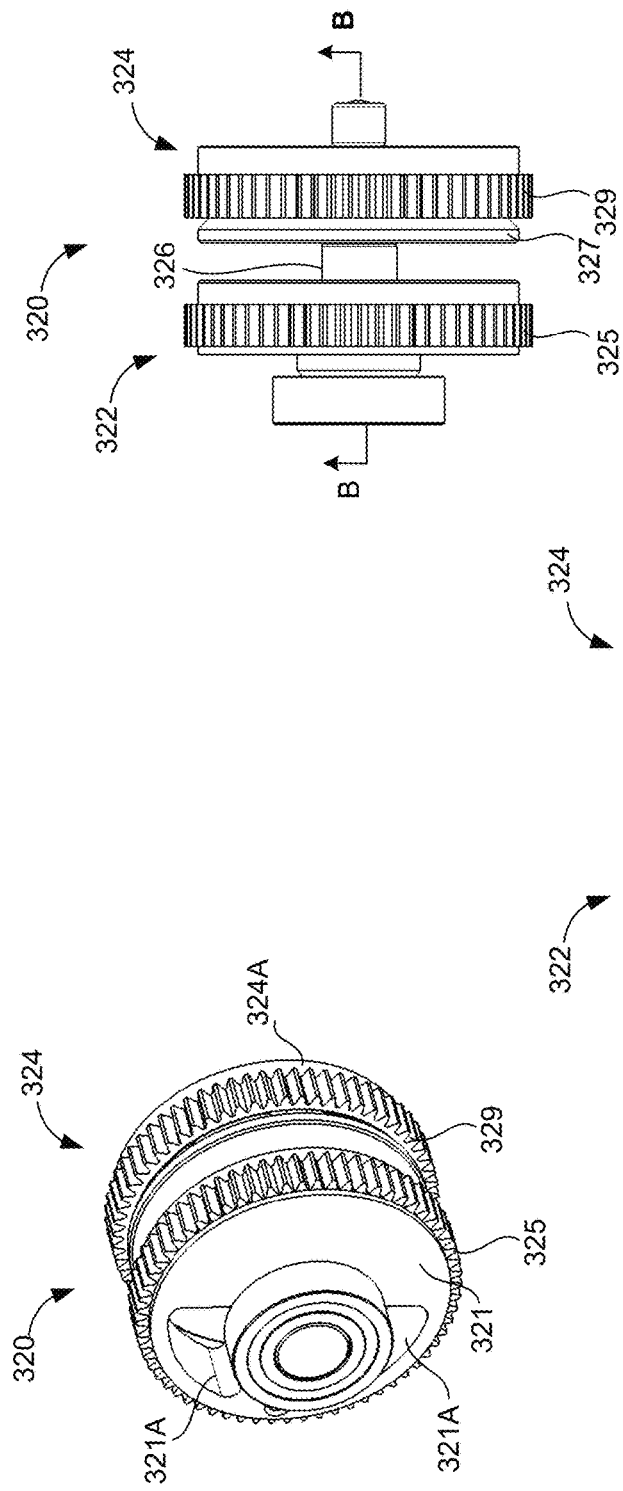
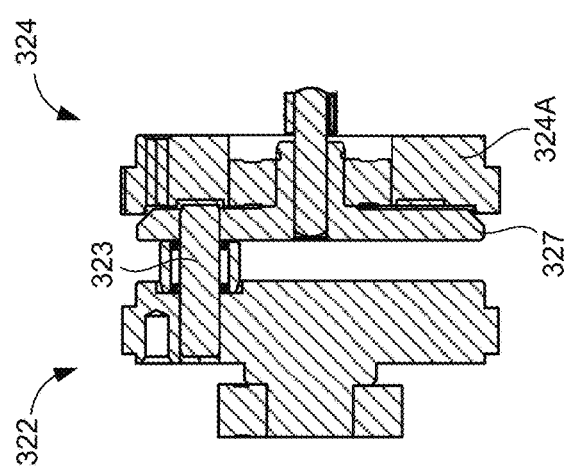
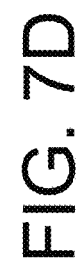
FIG. 7B
FIG. 7C
FIG. 7D

FORCE AND MOMENT CANCELING RECIPROCATING MECHANISM AND POWER TOOL HAVING SAME

FIELD

This document relates, generally, to a reciprocating mechanism for a power tool, and in particular, to a force and moment canceling reciprocating mechanism.

BACKGROUND

Reciprocating mechanisms may be included in various different types of tools, for example, reciprocating saws and jig saws, to convert rotary motion to linear motion, and/or to convert linear motion to rotary motion, for output by the tool. In a power tool, operation of a motor may generate a force, for example, a rotational force. A reciprocating mechanism may convert the rotational force, or rotational motion, output by the motor to a linear force, or linear motion, to drive a reciprocal motion of an output spindle of the tool. The reciprocating mechanism may be coupled to the motor by, for example, a transmission mechanism that provides for force transfer between the motor and the reciprocating mechanism. Vibration generated due to inertial forces in the reciprocating mechanism that result from acceleration/deceleration at the extreme ends of travel, particularly as operational speed and/or stroke length of the output spindle is increased, may adversely affect operation of the tool. Providing for balance in the reciprocating mechanism may improve user control of the tool and may enhance utility and operational safety, enabling a user to operate the tool for extended periods of time, versus a limited duration, for a tool having relatively high vibration during operation.

SUMMARY

In one aspect, a reciprocating tool may include a housing, a motor received in the housing, a reciprocating mechanism reciprocally coupled in the housing, and a transmission received in the housing. The transmission may include a first axis of operation, a second axis of operation, an input gear assembly engaged with the motor, the input gear assembly including counterweighted first and second input gears that balance forces generated about the first axis of operation and/or the second axis of operation, and an output gear assembly engaged with the input gear assembly, and engaged with the reciprocating mechanism, so as to transfer a force generated by the motor to the reciprocating mechanism. The output gear assembly may include counterweighted first and second output gears that balance forces generated about the first axis of operation and/or the second axis of operation. The reciprocating mechanism may be configured to convert a rotational force, generated by the motor and transferred thereto by the transmission, to a reciprocating linear force output by the reciprocating mechanism.

In some implementations, the input gear assembly may include a first input gear, a second input gear arranged coaxially with respect to the first input gear, a first counterweight feature provided on the first input gear, and a second counterweight feature provided on the second input gear. In some implementations, at least one of the first input gear or the second input gear may be engaged with an output shaft of the motor, so as to rotate in response to the rotational force generated by the motor. The first counterweight feature and the second counterweight feature may each be defined by at least one of an enlarged portion of the respective input gear such that a weight of the enlarged portion of the respective input gear is greater than a weight of a remaining portion of the respective input gear, at least one counterweight mass received in a corresponding recessed portion of the respective input gear, such that a weight of the recessed portion of the respective input gear is greater than a weight of a remaining portion of the respective input gear, or one or more slots defined in a slotted portion of the respective input gear, such that a weight of the slotted portion of the respective input gear is less than a weight of a remaining portion of the respective input gear.

In some implementations, the output gear assembly may include a first output gear in meshed engagement with the first input gear, a second output gear arranged coaxially with the first output gear, and in meshed engagement with the second input gear, a pin eccentrically mounted on a gear plate of one of the first output gear or the second output gear, wherein the reciprocating mechanism is coupled to the pin, a third counterweight feature provided on the first output gear, and a fourth counterweight feature provided on the second output gear. In some implementations, the third counterweight feature and the fourth counterweight feature may each be defined by at least one of an enlarged portion of the respective output gear, such that a weight of the enlarged portion of the respective output gear is greater than a weight of a remaining portion of the respective output gear, at least one counterweight mass received in a corresponding recessed portion of the respective output gear, such that a weight of the recessed portion of the respective output gear is greater than a weight of a remaining portion of the respective output gear, or one or more slots defined in a slotted portion of the respective output gear, such that a weight of the slotted portion of the respective output gear is less than a weight of a remaining portion of the respective output gear.

In some implementations, in response to rotation of the output shaft of the motor, the first input gear rotates in a first direction, the second input gear rotates in a second direction, opposite the first direction, the first output gear rotates in the second direction, and the second output gear rotates in the first direction. In some implementations, a spindle of the reciprocating mechanism may reciprocate linearly between a first end position of the spindle and a second end position of the spindle along the first axis of operation in response to the rotation of the first input gear, the second input gear, the first output gear and the second output gear. In some implementations, the first counterweight feature, the second counterweight feature, the third counterweight feature and the fourth counterweight feature are all positioned in phase and substantially aligned with the first axis of operation when the spindle is at the first end position, and when the spindle is at the second end position along the first axis of operation.

In some implementations, the input gear assembly includes a first counterweight and a second counterweight and the output gear assembly includes a third counterweight and a fourth counterweight that are all aligned with the second axis of operation when a spindle is at an intermediate position along the first axis of operation, between a first end position and a second end position of the first axis of operation. At the intermediate position of the spindle, a moment about the first axis of operation generated by rotational positions of two of the first counterweight, the second counterweight, the third counterweight and the fourth counterweight, may be balanced by an equal and opposite moment generated by rotational positions of the remaining two of the first counterweight, the second counterweight, the third counterweight and the fourth counterweight. At the intermediate position of the spindle, forces and moments about the first axis of operation, the second axis of operation, and a third axis of operation generated by rotational positions of any coaxial or coplanar pair of the first counterweight, the second counterweight, the third counterweight, and the fourth counterweight, may be balanced by equal and opposite forces and moments generated by the remaining coaxial or coplanar pair of the first counterweight, the second counterweight, the third counterweight, and the fourth counterweight.

In some implementations, the reciprocating mechanism may include a spindle, a blade at a first end portion of the spindle, and a slot formed in the blade. The pin of the output gear assembly may be movably received in the slot, to couple the transmission and the reciprocating mechanism, such that rotation of the output gear assembly is converted into linear movement of the reciprocating mechanism.

In some implementations, the input gear assembly may include a first outer gear on an outer circumferential surface of the first input gear, a first bevel gear on an inner face of the first input gear, facing the second input gear, a second outer gear on an outer circumferential surface of the second input gear, and a second bevel gear on an inner face of the second input gear, facing the first input gear. In some implementations, the first bevel gear and the second bevel gear may be in meshed engagement with a pinion gear of the motor, such that, in response to rotation of the pinion gear of the motor, the first input gear rotates in a first direction, and the second input gear rotates in a second direction.

In some implementations, the output gear assembly may include a third outer gear on an outer circumferential surface of the first output gear, in meshed engagement with the first outer gear of the first input gear, and a fourth outer gear on an outer circumferential surface of the second output gear, in meshed engagement with the second outer gear of the second input gear. In response to rotation of the first input gear in the first direction, the first output gear may rotate in the second direction. In response to rotation of the second input gear in the second direction, the second output gear may rotate in the first direction.

The details of one or more implementations are set forth in the accompanying drawings and the description below. Other features will be apparent from the description and drawings, and from the claims.

BRIEF DESCRIPTION OF THE DRAWINGS

FIG. 1A is a schematic view of an exemplary reciprocating tool.

FIG. 1D is an end view of the exemplary transmission mechanism of the exemplary tool shown in FIG. 1A.

FIGS. 6A-6D illustrate an exemplary input gear assembly of the exemplary transmission shown in FIGS. 5A and 5B, in which FIG. 6A is an exploded perspective view of the exemplary input gear assembly, FIG. 6B is an assembled perspective view of the exemplary input gear assembly, FIG. 6C is an end view of the exemplary input gear assembly, and FIG. 6D is a cross-sectional view of the exemplary input gear assembly taken along line A-A of FIG. 6C, in accordance with implementations described herein.

FIGS. 7A-7D illustrate an exemplary output gear assembly of the exemplary transmission shown in FIGS. 5A and 5B, in which FIG. 7A is an exploded perspective view of the exemplary output gear assembly, FIG. 7B is an assembled perspective view of the exemplary output gear assembly, FIG. 7C is an end view of the exemplary output gear assembly, and FIG. 7D is a cross-sectional view of the output gear assembly taken along line B-B of FIG. 7C, in accordance with implementations described herein.

DETAILED DESCRIPTION

Figure 1B:
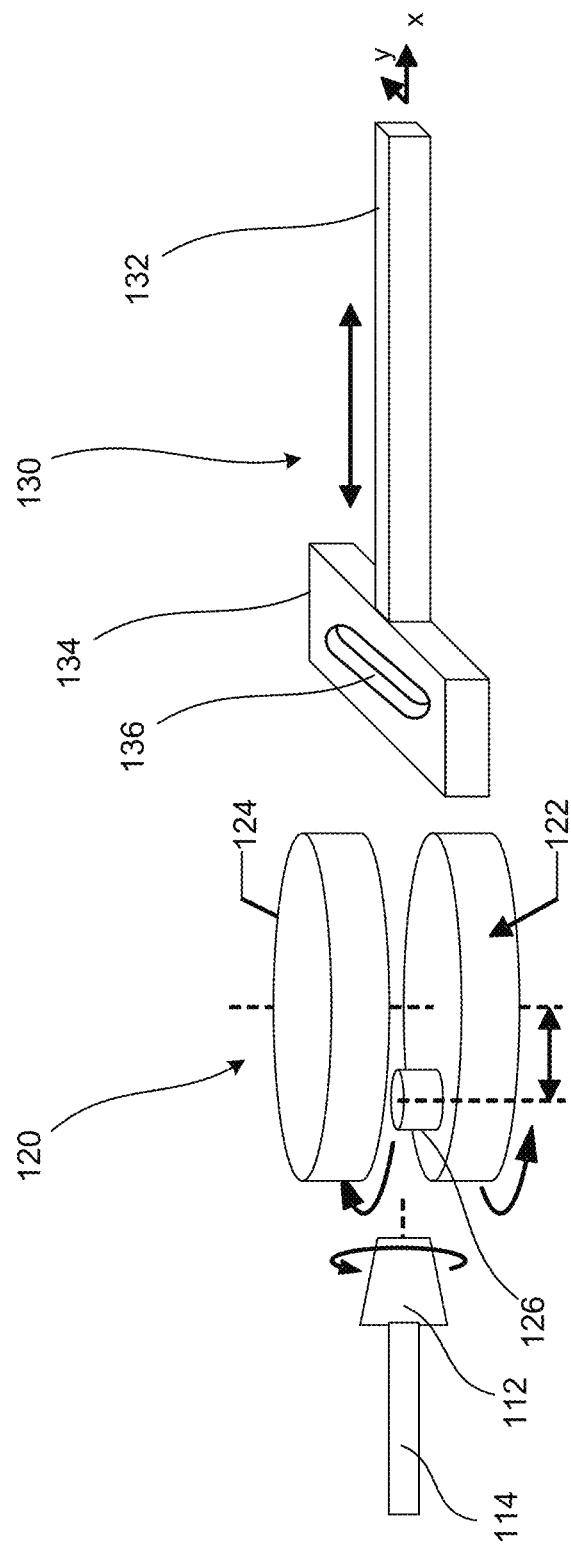
FIG. 1B is an exploded schematic view of an exemplary driving system of the exemplary tool shown in FIG. 1A.

A schematic view of an exemplary power-driven tool 100 including a reciprocating mechanism is shown in FIG. 1A. As shown in FIG. 1A, the exemplary tool 100 may include a motor 110 generating a rotational driving force. A transmission mechanism 120 may be coupled between the motor 110 and a reciprocating mechanism 130, to transfer/convert the rotational driving force generated by the motor 110 to the reciprocating mechanism 130. In an arrangement in which the driving force generated by the motor 110 is a rotational force, or a rotational motion, the transmission mechanism 120 converts the rotational motion produced by the motor 110 into a linear force, or linear motion. In some implementations, this linear force, or linear motion, may be output by an output accessory 140 attached to the reciprocating mechanism 130. In some implementations, this linear force, in the form of, for example, reciprocal motion of a piston of the reciprocating mechanism 130, may act directly on the fluid to produce, for example compressed air. The motor 110, the transmission mechanism 120, and the reciprocating mechanism 130 may be received in and/or coupled to a housing 190. The output accessory 140 may be coupled to the reciprocating mechanism 130, and may extend from the housing 190, to interact with a workpiece (not shown in FIG. 1A). In some implementations, the motor 110 may be an electric motor that receives power from, for example, a power storage device (such as, for example, a battery), an external electrical power source, and the like. In some implementations, the motor 110 may be an air driven, or pneumatic motor, that is powered by compressed air introduced into the housing 190 from an external compressed air source. Other types of motors, and other sources of power, may provide for power driven operation of the tool 100. In some implementations, the reciprocating mechanism 130 may include, for example, a scotch yoke mechanism, a slider crank mechanism, and other such mechanisms that can facilitate a conversion between rotary motion and linear motion. In some implementations, the output accessory 140 may include, for example, a blade.

In a powered tool that makes use of reciprocal motion, vibration may be generated by multiple sources. For example, vibration may be generated by interaction forces, or frictional forces between a cutting implement, such as a blade, coupled to the output accessory 140 and a work piece during operation. Inertial forces, due to relative movement of the internal components of the tool 100, may cause instability and/or vibration, whether or not the tool 100 is engaged with a work piece. For example, as internal components of the various mechanisms of the tool 100 move and change direction, reaction forces are generated to accelerate/decelerate the component(s). In a situation in which the tool 100 is not rigidly fixed to a mounting surface, but rather, held by an operator, the cyclic nature of this type of motion results in vibration experienced by the operator. The reciprocal motion of the output accessory 140 (and a cutting implement coupled thereto) may cause opposite, reciprocal motion to be felt, or experienced by the operator, as vibration. This vibration may adversely affect precision and utility of the tool 100.

An exemplary transmission mechanism 120 and an exemplary reciprocating mechanism 130 are shown in FIG. 1B. In order to convert the driving force, for example, rotational force, generated by the motor 110 to a linear force to be output by the reciprocating mechanism 130, the transmission mechanism 120 may include a first spiral bevel gear 122 (also referred to simply as first gear 122) and a second spiral bevel gear 124 (also referred to simply as second gear 124). An eccentric pin 126 may be provided on one of the first gear 122 or the second gear 124. The eccentric pin 126 may be received in a slot 136 defined in a yoke 134 of the reciprocating mechanism 130. A pinion gear (also referred to as a motor output gear) 112 at a distal end of an output shaft 114 of the motor 110 may be, for example, in meshed, rotational engagement with the transmission mechanism 120. The motor output gear 112 includes a set of circumferential teeth (not illustrated in FIG. 1B) that engage a set of teeth of the first output gear 122 (not illustrated in FIG. 1B) and a set of teeth of the second output gear 124 (not illustrated in FIG. 1B). This engagement may cause rotation of the transmission mechanism 120, including movement of the first gear 122 and the second 124 in opposite directions and corresponding movement of the eccentric pin 126 received in the slot 136 of the reciprocating mechanism 130, and linear movement of a spindle 132 of the reciprocating mechanism 130.

In general, a component may be considered counterweighted when a net effect of various features of the component results in a center of mass of the component being radially offset from an axis of rotation of the component (generating static unbalance), or off-diagonal terms of the inertia matrix are made non-zero (creating a couple unbalance), providing some degree of asymmetry to the component. These features, alone or in combination, may yield a component that may be considered a counterweight. Counterweighting of a component such as, for example, the first gear 122 and the second gear 124 shown in FIG. 1C, may be achieved in different manners. For example, in some implementations, counterweighting may be achieved by the removal of material from one side of the component, or in an asymmetric pattern of features such as, for example more, or fewer, holes or openings formed on one side of the component compared to the other side of the component. In some implementations, counterweighting may be achieved by the addition of material to one side of the component through, for example, variation in contour and/or density of material, one or more separately attached mass(es), and the like. In some implementations, counterweighting may be achieved by an axis of rotation of the component that is eccentric or offset from the radial center of the component. In some implementations, various combinations of these features may provide desired counterweighting of a component such as, for example, the first and second gears 122, 124 shown in FIG. 1C.

Figure 1C:
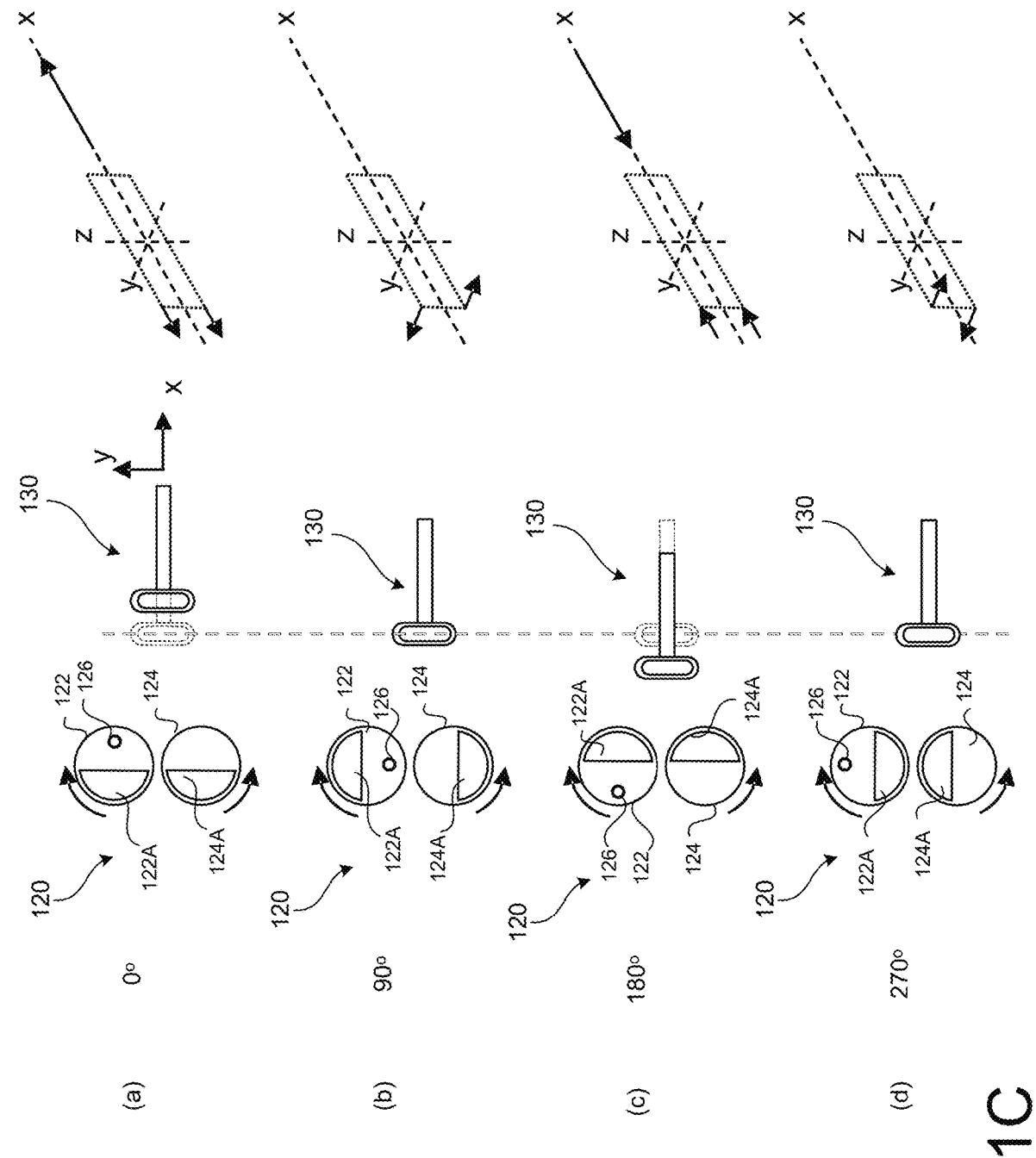
FIG. 1C schematically illustrates states of operation of an exemplary transmission mechanism and an exemplary reciprocating mechanism of the exemplary tool shown in FIG. 1A.

As shown in FIG. 1C, the first gear 122 may include one or more counterweight features, and the second gear 124 may include one or more counterweight features. As the first gear 122 and second gear 124 rotate when the motor 110 operates, the counterweight features generate forces that can be used to counter the inertial and vibratory forces generated due to the movement and positioning of the reciprocating mechanism 130.

Figure 1E:
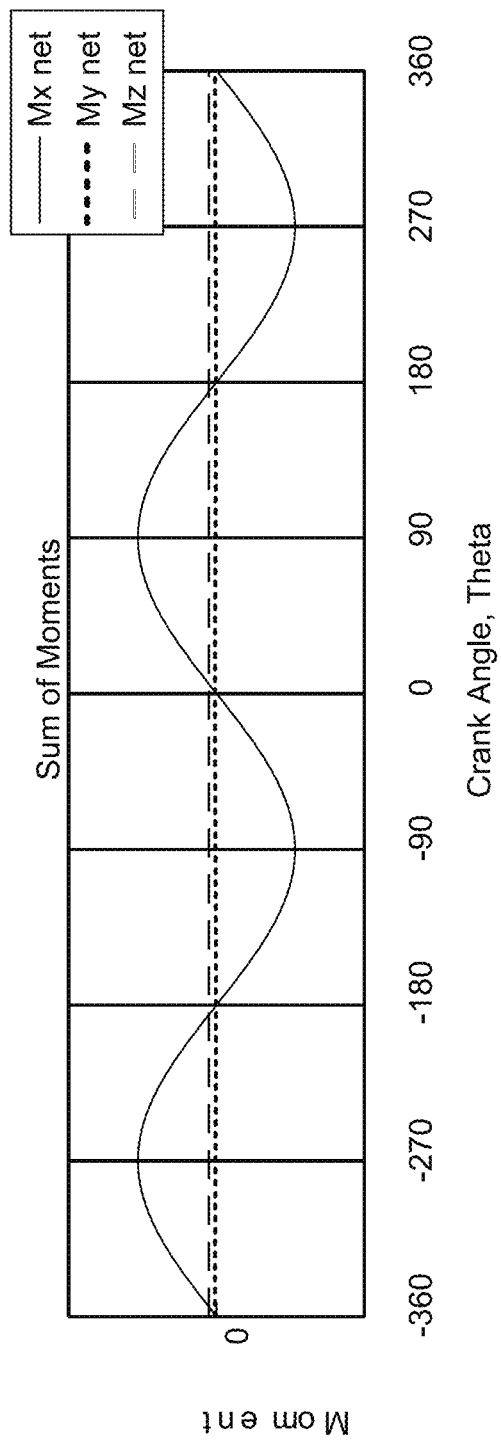
FIG. 1E is a graph of the sum of forces and moments produced during operation of the exemplary tool including the exemplary driving system shown in FIGS. 1A-1D.

In the example shown in FIG. 1C, the first gear 122 includes an exemplary counterweight 122A, and the second gear 124 includes an exemplary counterweight 124A. Relative positioning of the counter-rotating first and second gears 122, 124 of the transmission mechanism 130 relative to the linear position of the reciprocating mechanism 130 are shown in FIG. 1C. In this arrangement, a moment may be created due to, for example, a lateral offset L between the first and second gears 122, 124 (see FIG. 1D), when the first and second gears are out of phase, as shown in FIG. 1C(b) and FIG. 1C(d). This may result in a moment curve as illustrated in FIG. 1E, as the first and second gears 122, 124 rotate. The resulting moment may produce a vibratory effect, experienced by an operator of the tool 100, both while the tool 100 is at load (i.e., engaged with a workpiece), and at no load (i.e., motor 110 operating, but not engaged with a workpiece).

A moment canceling reciprocating mechanism, in accordance with implementations described herein, may substantially fully counterbalance the forces and/or moments generated during operation of a tool including such a reciprocating mechanism, thus reducing or substantially eliminating vibration of such a tool. This may allow an operating speed or stroke of the tool to be increased without adversely affecting vibration, thus increasing performance and enhancing utility of the tool.

Figure 2A:
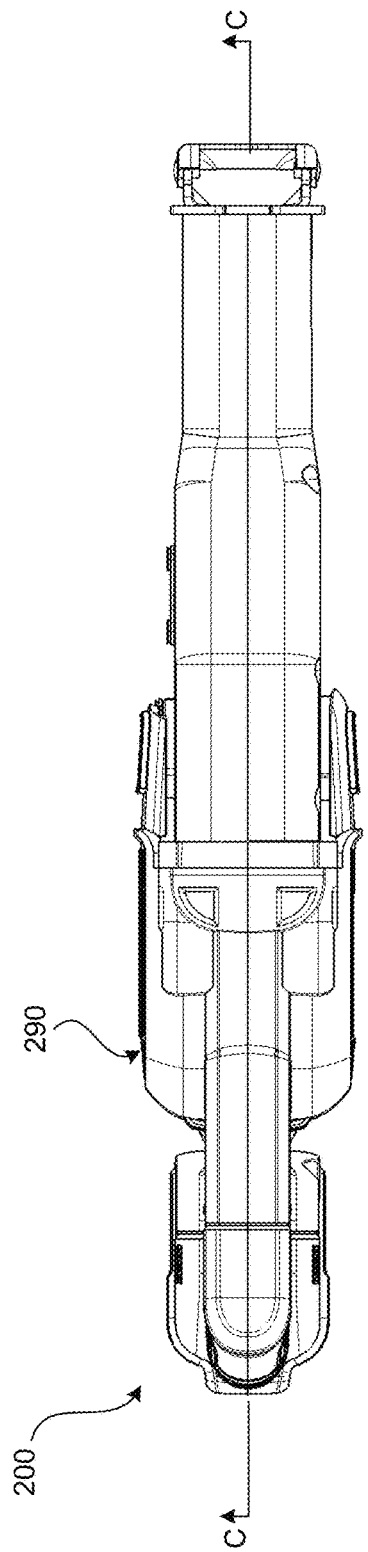
FIG. 2A is a top view.
Figure 2B:
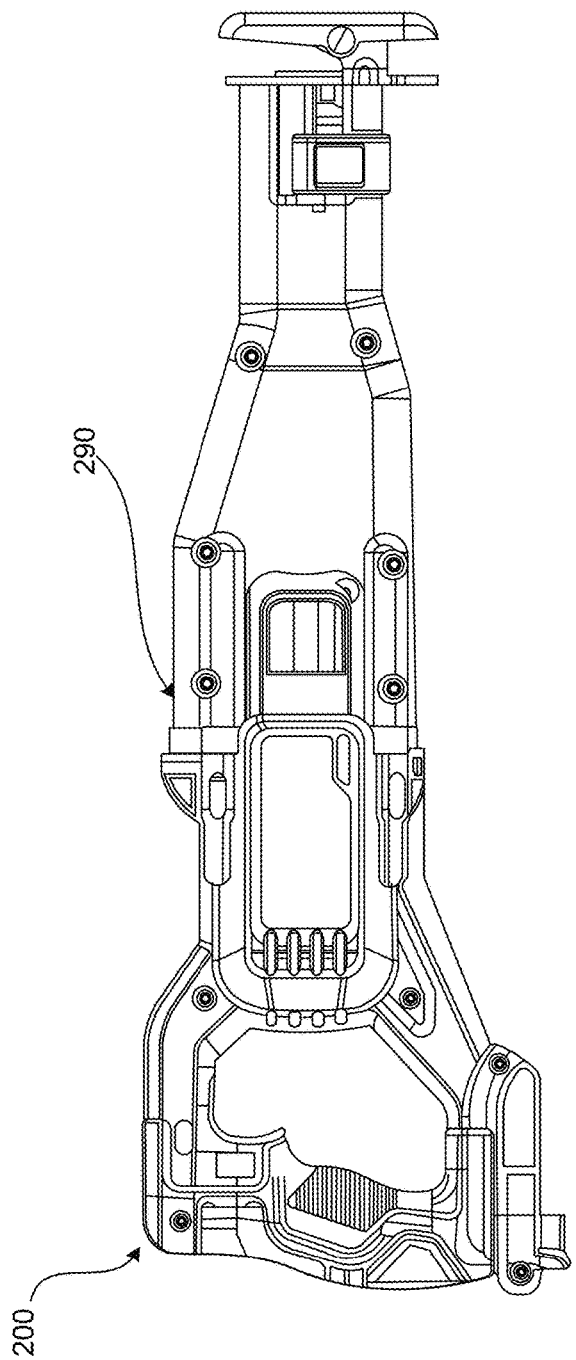
FIG. 2B is a side view of an exemplary reciprocating tool, in accordance with implementations described herein.
Figure 3:
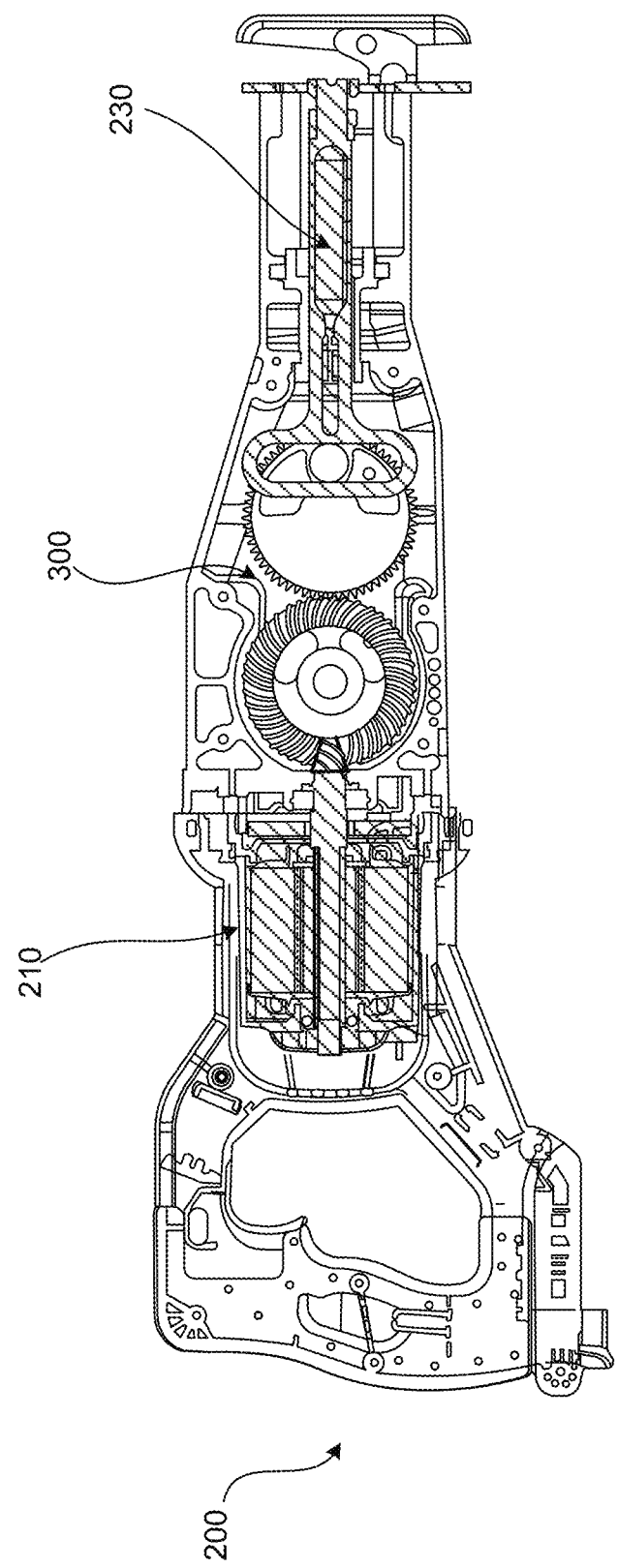
FIG. 3 is a cross-sectional view of the exemplary tool taken along line C-C of FIG. 2A, in accordance with implementations described herein.

FIGS. 2A and 2B illustrate an exemplary power-driven tool 200, in accordance with implementations described herein. In particular, FIG. 2A is a top view, and FIG. 2B is a side view of the exemplary power-driven tool 200. The exemplary power-driven tool 200 shown in FIGS. 2A and 2B is a power-driven reciprocating tool, and in particular, a power-driven reciprocating saw, simply for purposes of discussion and illustration. However, principles to be described herein may be applied to other types of power-driven tools that implement reciprocating motion, and that may benefit from a balanced reciprocating mechanism, such as, for example, jig saws, scroll saws, oscillating tools, piston-style air compressors, and the like. FIG. 3 is a cross-sectional view of the exemplary power-driven reciprocating tool 200 taken along line C-C of FIG. 2A. In FIG. 3, portions of a motor 210, a transmission 300, and a reciprocating mechanism 230 are visible.

Figure 4A:
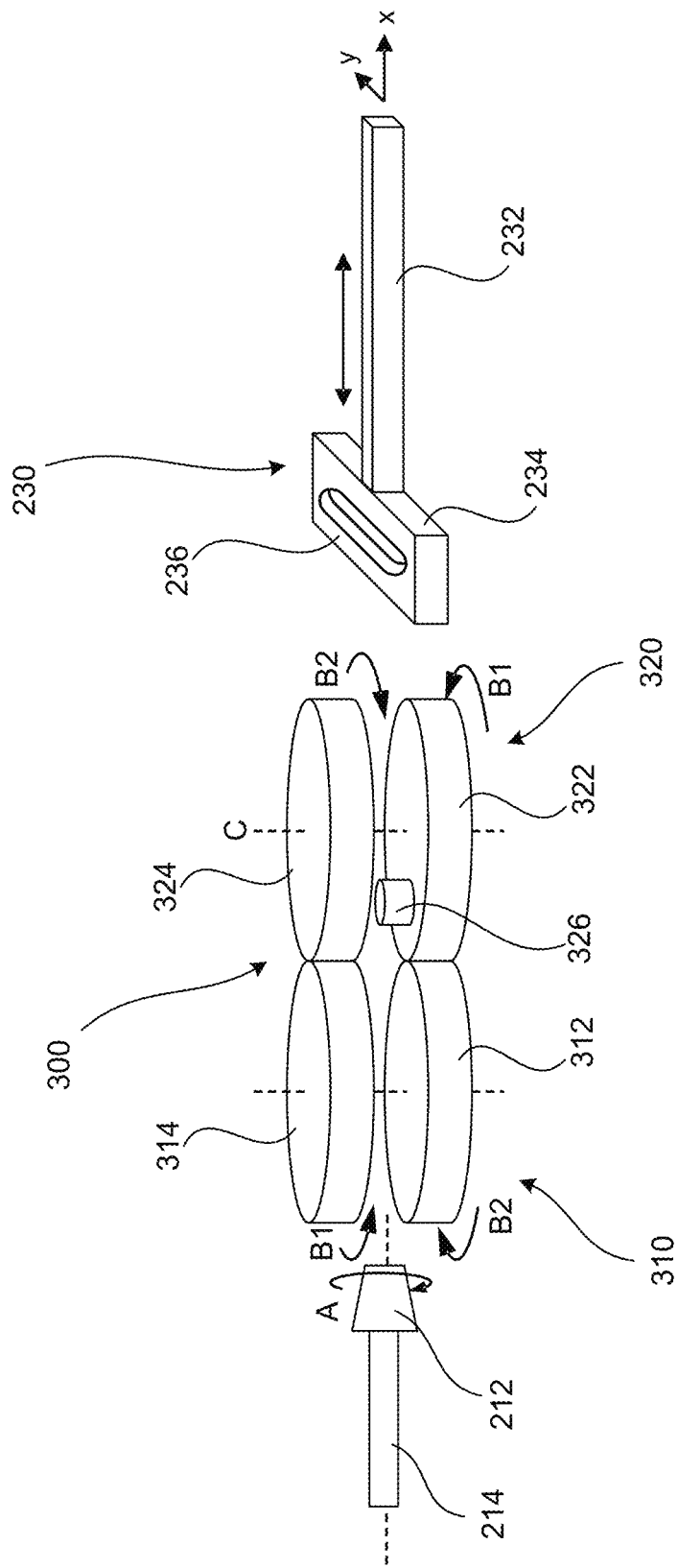
FIGS. 4A-4C are exploded schematic views of exemplary driving systems of the exemplary tool shown in FIGS. 2A through 3, including a force and moment canceling reciprocating mechanism, in accordance with implementations described herein.
Figure 4B:
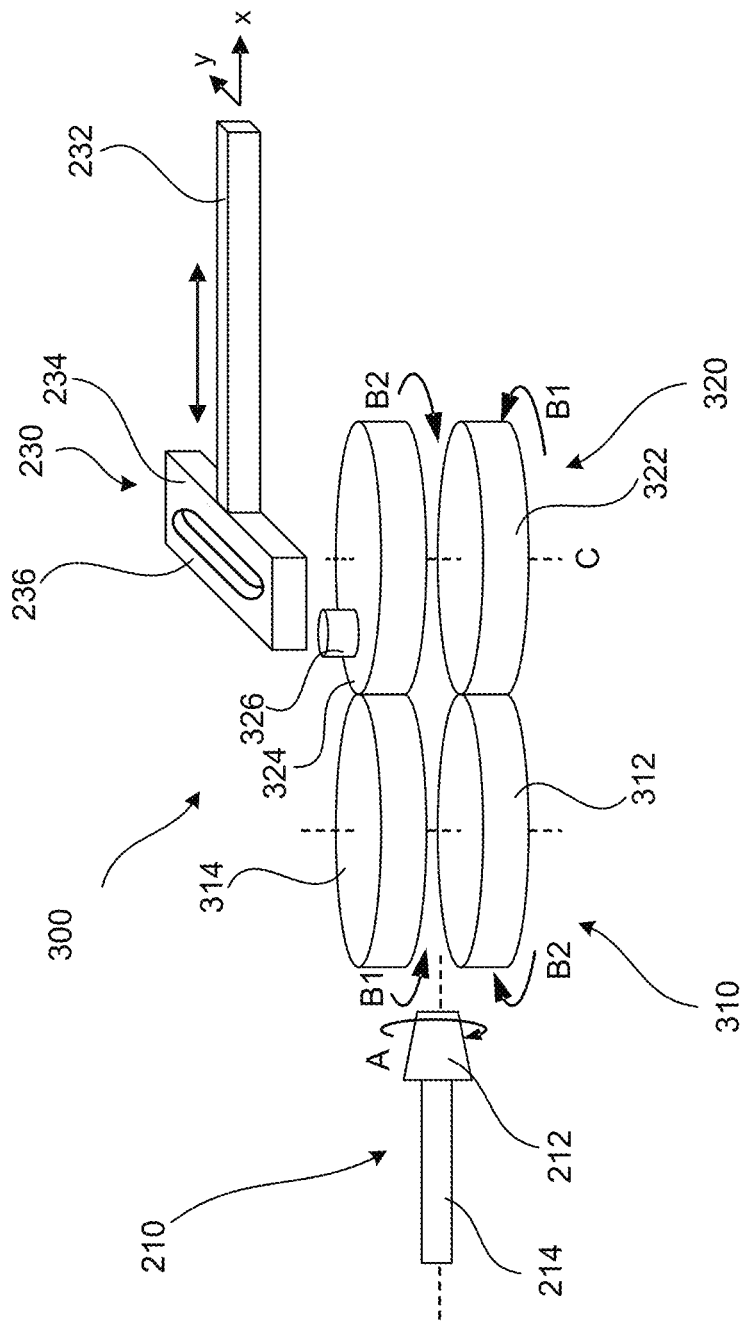
Figure 4C:
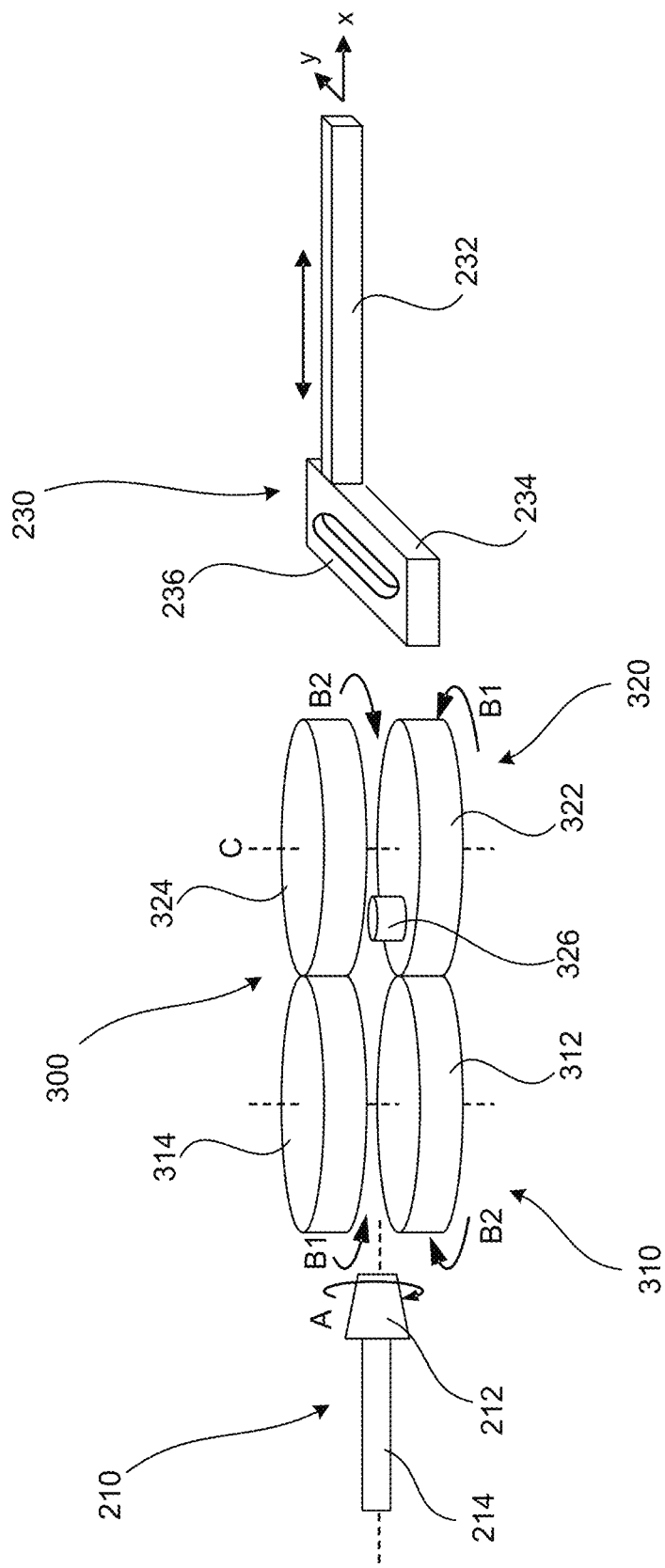

FIG. 4A is an exploded schematic diagram of an arrangement of components of an exemplary driving system including the exemplary motor output pinion gear 212 connected to a motor output spindle 214 of the motor 210, the exemplary transmission 300, and the exemplary reciprocating mechanism 230 of the exemplary power-driven tool 200 shown in FIGS. 2A and 2B. In the exemplary arrangement shown in FIG. 4A, the reciprocating mechanism 230 is engaged with an eccentric pin 326 between a first output gear 322 and a second output gear 324. The eccentric pin 326 is attached to the first output gear 322. Alternatively, the eccentric pin 326 could be attached to the second output gear 324. In the exemplary arrangement shown in FIG. 4B, the reciprocating mechanism 230 is engaged with an eccentric pin 326 on the second output gear 324 (or on the first output gear 322) so that the reciprocating mechanism 230 is positioned above (or below) the transmission 300. In the exemplary arrangement shown in FIG. 4C, the reciprocating mechanism 230 is engaged with the eccentric pin 326 between the first output gear 322 and the second output gear 324, and includes a spindle portion 232 that is offset from a central portion of a yoke portion 234 thereof. Hereinafter, simply for ease of discussion and illustration, an arrangement as shown in FIG. 4A will be discussed.

In order to convert the driving force, for example, rotational force, generated by the motor 210 to a linear force to be output by the reciprocating mechanism 230 (and, in some implementations, an output accessory attached to the reciprocating mechanism 230), while also balancing the inertial forces and moments described above, the transmission 300 may include four counter-rotating counterweights respectively included with four gears, to substantially fully counteract unbalance of the driving system. For example, in some implementations, the transmission 300 may include a driving gear assembly 310 (also referred to as an input gear assembly 310), and a driven gear assembly 320 (also referred to as an output gear assembly 320). The input gear assembly 310 may be engaged with the motor 210. For example, the input gear assembly 310 may be engaged with the motor output pinion gear 212 connected to the output shaft 214 of the motor 210, to receive a rotational force output by the motor 210. In some implementations, the output pinion gear 212 of the motor 210 may be in meshed engagement with the input gear assembly 310. In some implementations, the output gear assembly 320 may be engaged with the input gear assembly 310, and with the reciprocating mechanism 230, so as to transfer the force, output by the motor 210, to the reciprocating member 230. The coupling of the output gear assembly 320 and the reciprocating mechanism 230 may be such that the rotational force output by the motor 210 is converted to a reciprocating linear force output by the reciprocating mechanism 230. In some implementations, the motor 210 may engage other components of the driving gear assembly 310 and/or the driven gear assembly 320. For example, in some implementations, the motor pinion 212 may directly engage, for example, the first output gear 322, with additional gearing and/or belting and/or other mechanical components providing for connection of the remaining gear components to preserve the respective directions of rotation.

Figure 5A:
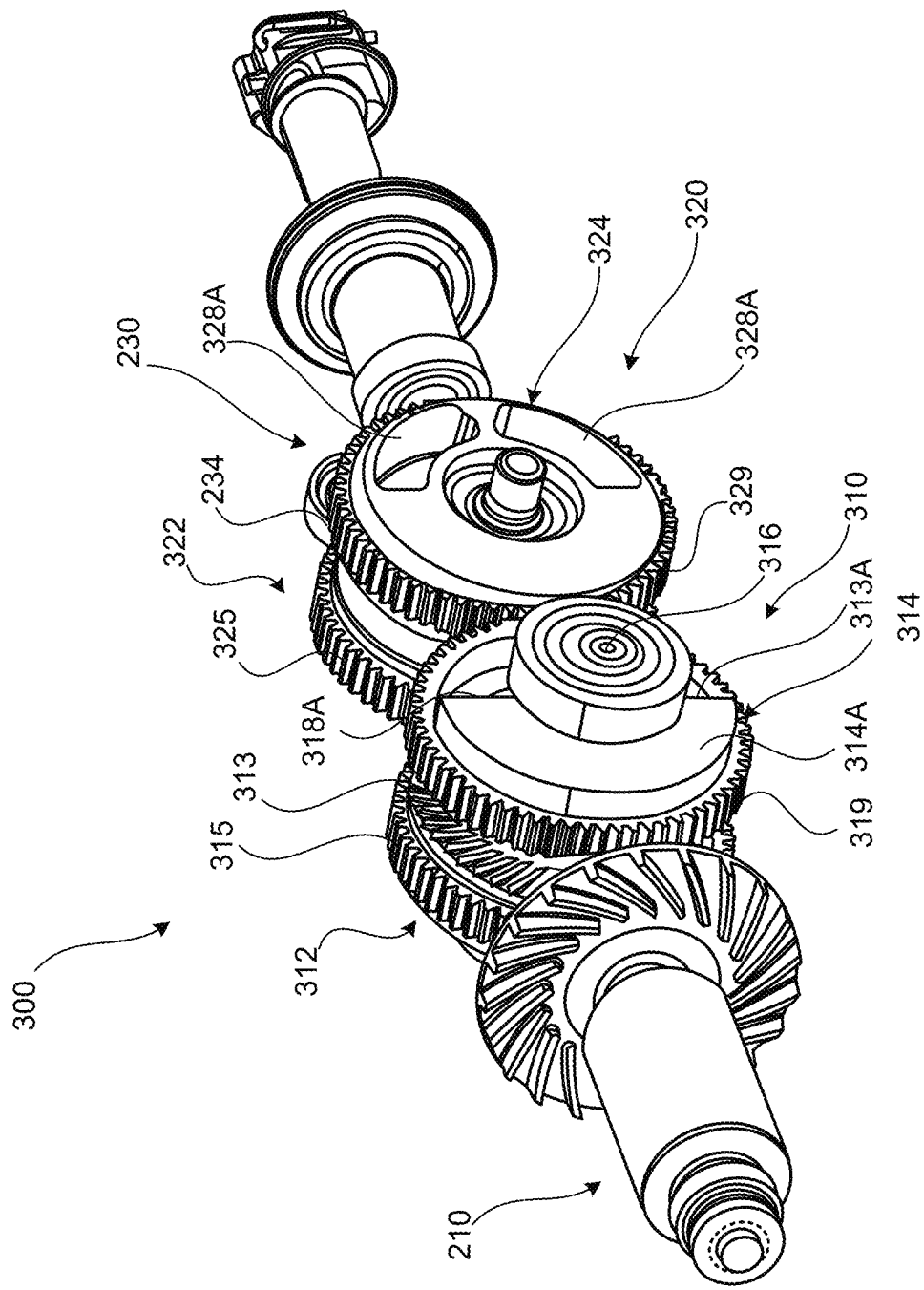
FIG. 5A is a perspective view of a first side of an exemplary transmission of the exemplary tool shown in FIG. 2A through 3, in accordance with implementations described herein.
Figure 5B:
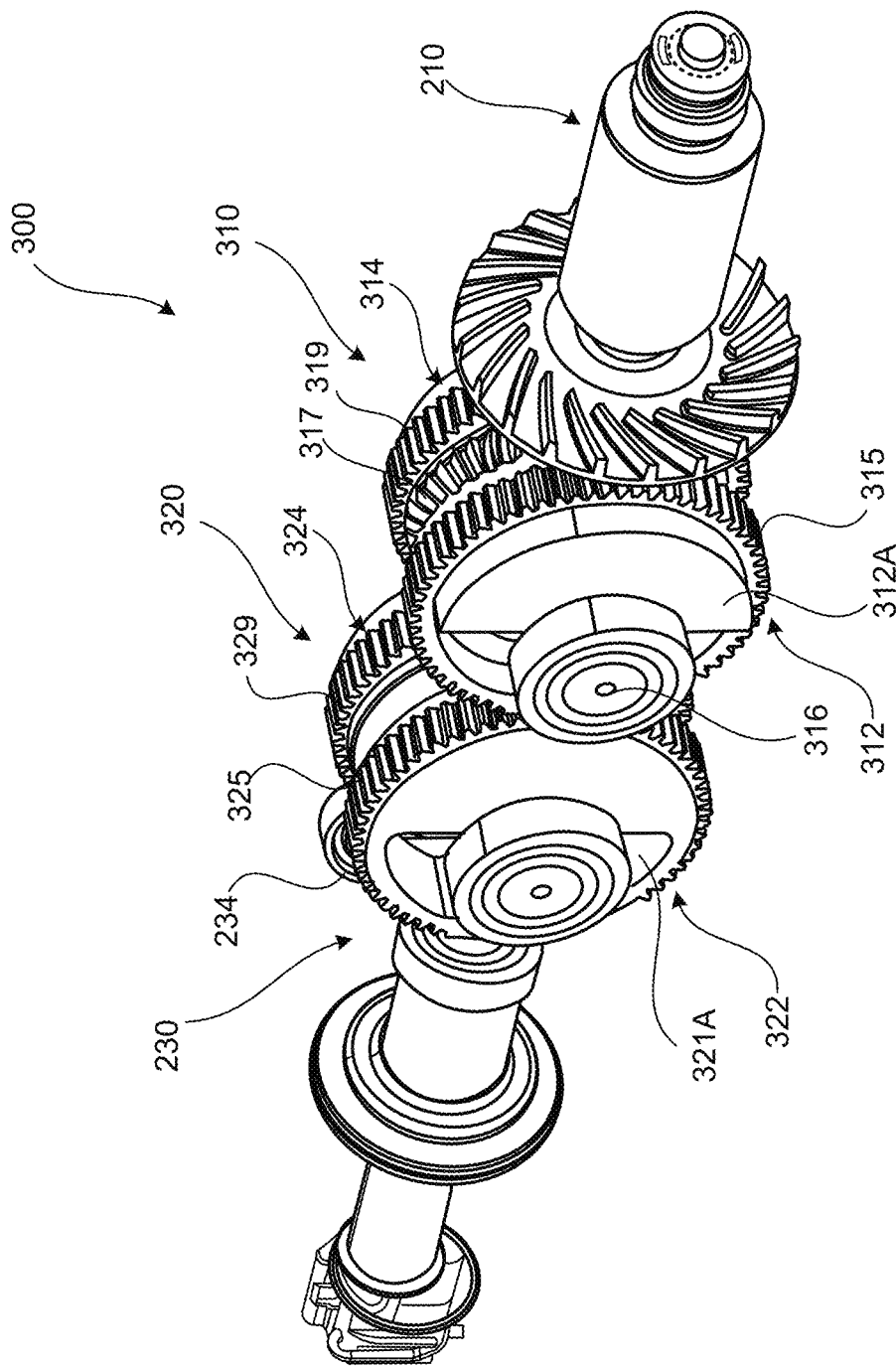
FIG. 5B is a perspective view of a second side of an exemplary transmission of the exemplary tool shown in FIGS. 2A through 3, in accordance with implementations described herein.
Figure 6A:
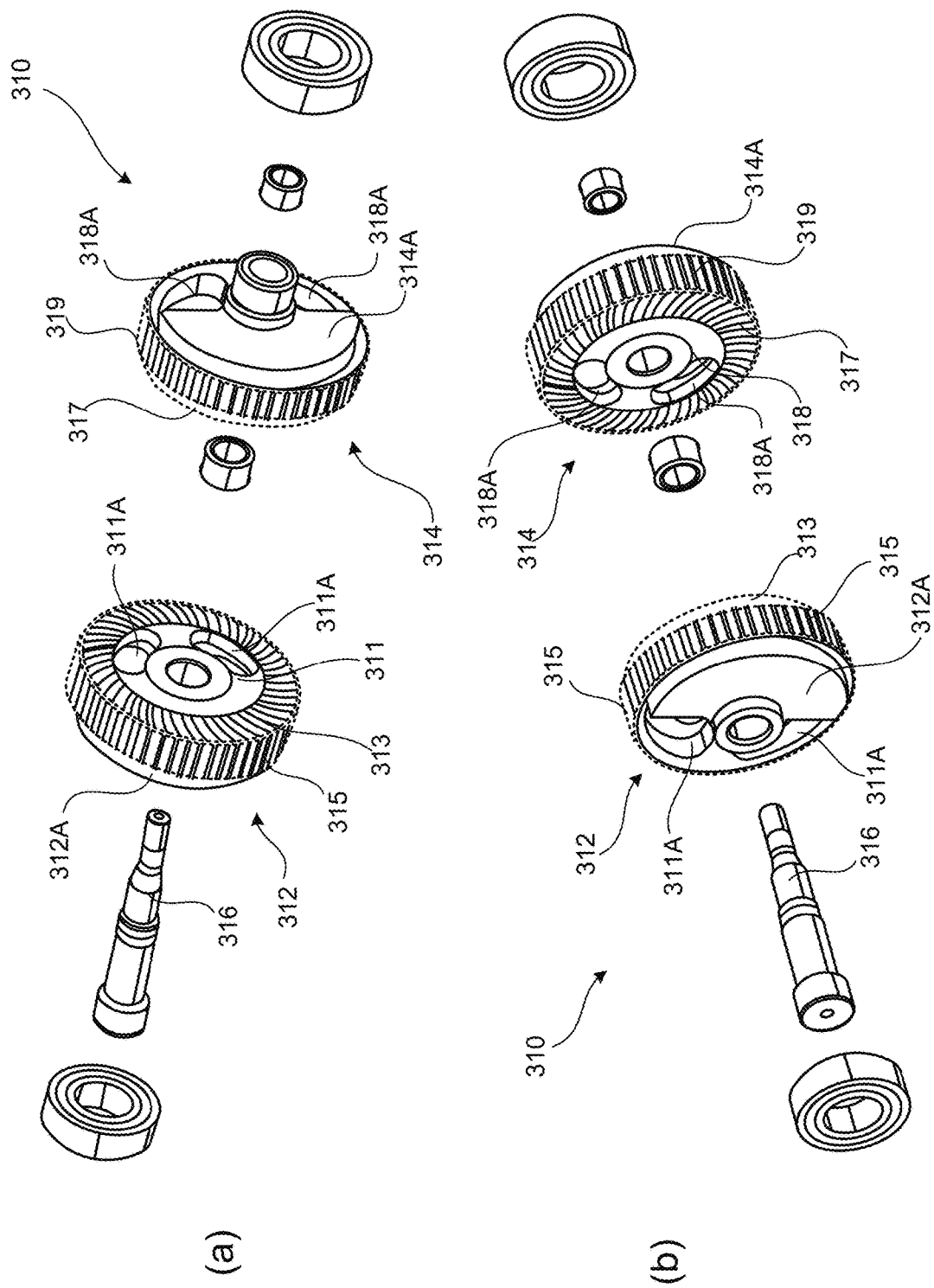
Figure 6C:
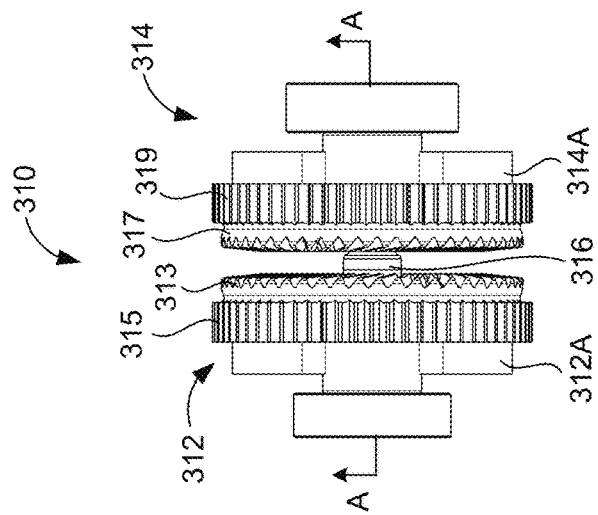
Figure 6D:
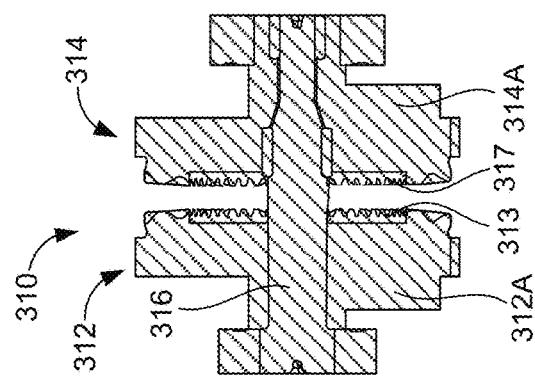
Figure 6B:
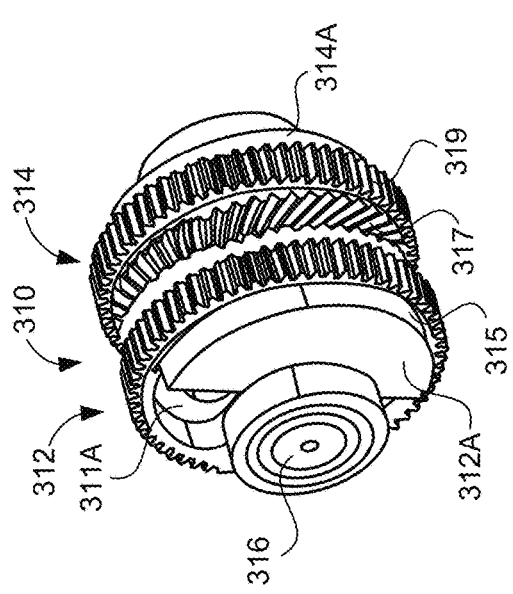
Figure 7A:
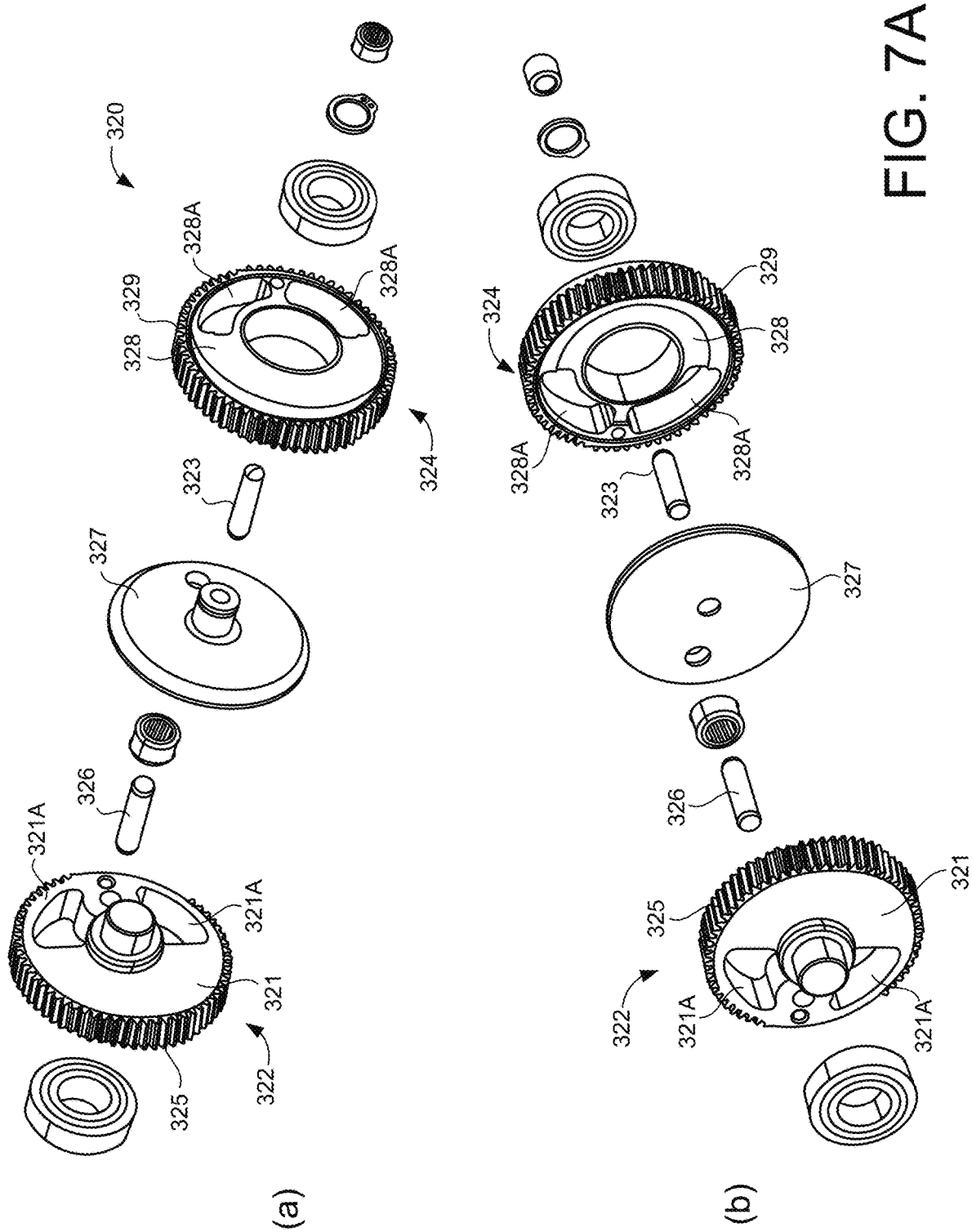

FIG. 5A is an assembled perspective view, taken from a first side of the exemplary driving system of the exemplary power-driven reciprocating tool 200, and FIG. 5B is an assembled perspective view, taken from a second side of the exemplary driving system of the exemplary power-driven reciprocating tool 200. FIG. 6A provides an exploded perspective view of the input gear assembly 310, including a first perspective view (FIG. 6A(a)) taken from the first side of the input gear assembly 310, and a second perspective view (FIG. 6A(b)) taken from the second side of the input gear assembly 310. FIG. 6B is an assembled perspective view of the input gear assembly 310, FIG. 6C is an end view of the input gear assembly 310, and FIG. 6D is a cross-sectional view taken along line A-A of FIG. 6C. FIG. 7A provides an exploded perspective view of the output gear assembly 320, including a first perspective view (FIG. 7A(a)) taken from the first side of the output gear assembly 320, and a second perspective view (FIG. 7A(b)) taken from the second side of the output gear assembly 320. FIG. 7B is an assembled perspective view of the output gear assembly 320, FIG. 7C is an end view of the output gear assembly 320, and FIG. 7D is a cross-sectional view taken along line B-B of FIG. 7C. FIGS. 8A-8D are exploded perspective views of exemplary input gears and output gears of an exemplary transmission of the exemplary reciprocating tool, in accordance with implementations described herein.

As shown in FIGS. 6A-6D, the input gear assembly 310 may include a first input gear 312 and a second input gear 314 mounted on a shaft 316. The first input gear 312 and the second input gear 314 may each include both a bevel face gear (straight or spiral as shown) and a cylindrical outer diameter gear (helical or spur as shown). The bevel face gear and the cylindrical outer diameter gear may be discrete elements or may be formed as a single integral unit. Either way, each input gear 312 and 314 may be considered a combination (or hybrid) gear, containing two separate gear forms, one bevel gear and one cylindrical gear. The first input gear 312 may include an inner bevel gear 313 including a set of bevel gear teeth on an inner facing side of a first input gear plate 311, and a first outer gear 315 including a set of gear teeth positioned along an outer circumferential surface of the first input gear plate 311. The second input gear 314 may include an inner bevel gear 317 including a set of bevel gear teeth on an inner facing side of a second input gear plate 318, and a second outer gear 319 including a set of gear teeth positioned along an outer circumferential surface of the second input gear plate 318. The first input gear 312 may include one or more counterweight features, such as, for example a counterweight 312A (see FIG. 6A), or removal of material (for example, in the form of the recesses 311A) and the like. Similarly, the second input gear 314 may include one or more counterweight features such as, for example, a counterweight 314A (see FIG. 6A), or removal of material (for example, in the form of the recesses 318A) and the like. The counterweight(s) 312A, 314A and/or the recess(es) 311A, 318A, and/or a combination thereof, may contribute to the counter-balancing of the inertial forces and moments described above.

As shown in FIGS. 7A-7D, the output gear assembly 320 may include a first output gear 322 and a second output gear 324. The first output gear 322 may include a first outer gear 325 including a set of gear teeth positioned along an outer circumferential surface of a first output gear plate 321. The first output gear 322 may also include a support plate 327. A first end portion of an eccentric pin 326 may be coupled both to the first output gear plate 321 and to the support plate 327. The support plate 327 may be mounted on a shaft 323. The second output gear 324 may include a second outer gear 329 positioned along an outer circumferential surface of a second output gear plate 328. The second output gear plate 328 may be mounted on a bearing grounded to either the first output gear 322 (as shown) or to the housing. The first output gear 322 may include one or more counterweight features, such as, for example, removal of material, achieved by, for example, the recesses 321A, and the like. Similarly, the second output gear 324 may also include one or more counterweight features, such as, for example, removal of material, achieved by, for example, the recesses 328A, and the like. The recess(es) 321A, 328A, and/or a combination of other counterweight features, may contribute to the counter-balancing of the inertial and moment forces described above.

Further, the counterweight(s) 312A, 314A and/or the recess(es) 311A, 318A of the input gear assembly 310, together with the counterweight(s) 322A, 324A and/or the recess(es) 321A, 328A, and/or various combination(s) thereof, may work together to substantially fully counterbalance the inertial and moment forces described above.

In the exemplary arrangement shown in FIGS. 5A-7D, the motor output pinion gear 212 of the motor 210 is in meshed engagement with the input gear assembly 310. For example, in some implementations, the motor output pinion gear 212 at an end portion of the motor output shaft 214 of the motor 210, may be in meshed engagement with the first bevel gear 313 provided on an inner face of the first input gear 312, and with the second bevel gear 317 provided on an inner face of the second input gear 314. The first outer gear 315 of the first input gear 312 may be in meshed engagement with the first outer gear 325 of the first output gear 322. The second outer gear 319 of the second input gear 314 may be in meshed engagement with the second outer gear 329 of the second output gear 320. The eccentric pin 326 (of the first output gear 322) may be received in the slot 236 of the yoke portion 234 of the reciprocating mechanism 230.

In this arrangement, during operation, rotation of the output shaft 214 of the motor 210, in a direction illustrated by the arrow A, may cause the first input gear 312 to rotate in the direction of the arrow B2, and may cause the second input gear 314 to rotate in the direction of the arrow B1. The rotation of the first input gear 312 in the direction B2 (and the meshed engagement of the set of teeth of the first outer gear 315 of the first input gear 312 and the set of teeth of the first outer gear 325 of the first output gear 322) may cause the first output gear 322 to rotate in the direction B1. Similarly, the rotation of the second input gear 314 in the direction B1 (and the meshed engagement of the set of teeth of the second outer gear 319 of the second input gear 314 and the set of teeth of the second outer gear 329 of the second output gear 324) may cause the second output gear 324 to rotate in the direction B2. Rotation of the output gear assembly 320 in this manner may cause corresponding movement of the eccentric pin 326, received in the slot 236 of the reciprocating mechanism 230, about axis C resulting in the linear movement of the spindle portion 232 of the reciprocating mechanism 230.

In some implementations, the respective counterweight(s) 312A, 314A, of the first input gear 312 and the second input gear 314 may be defined by an enlarged portion of the gear 312, 314, such as additional material, for example, in the form of a change in contour or profile, or additional thickness, in a weighted portion of the respective gear 312, 314.

Figure 8A:
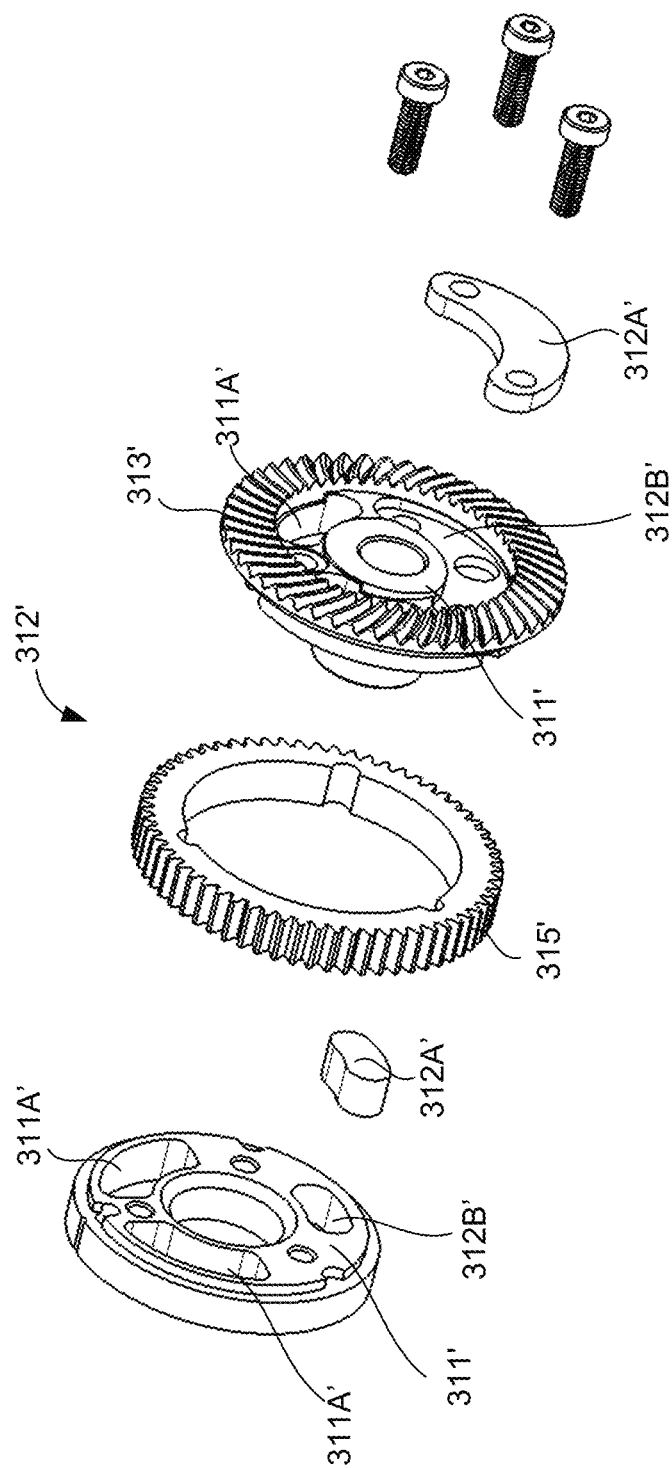
FIGS. 8A-8D illustrate alternate exemplary embodiments of input and output gears of an exemplary transmission of the exemplary reciprocating tool, in accordance with implementations described herein.
Figure 8B:
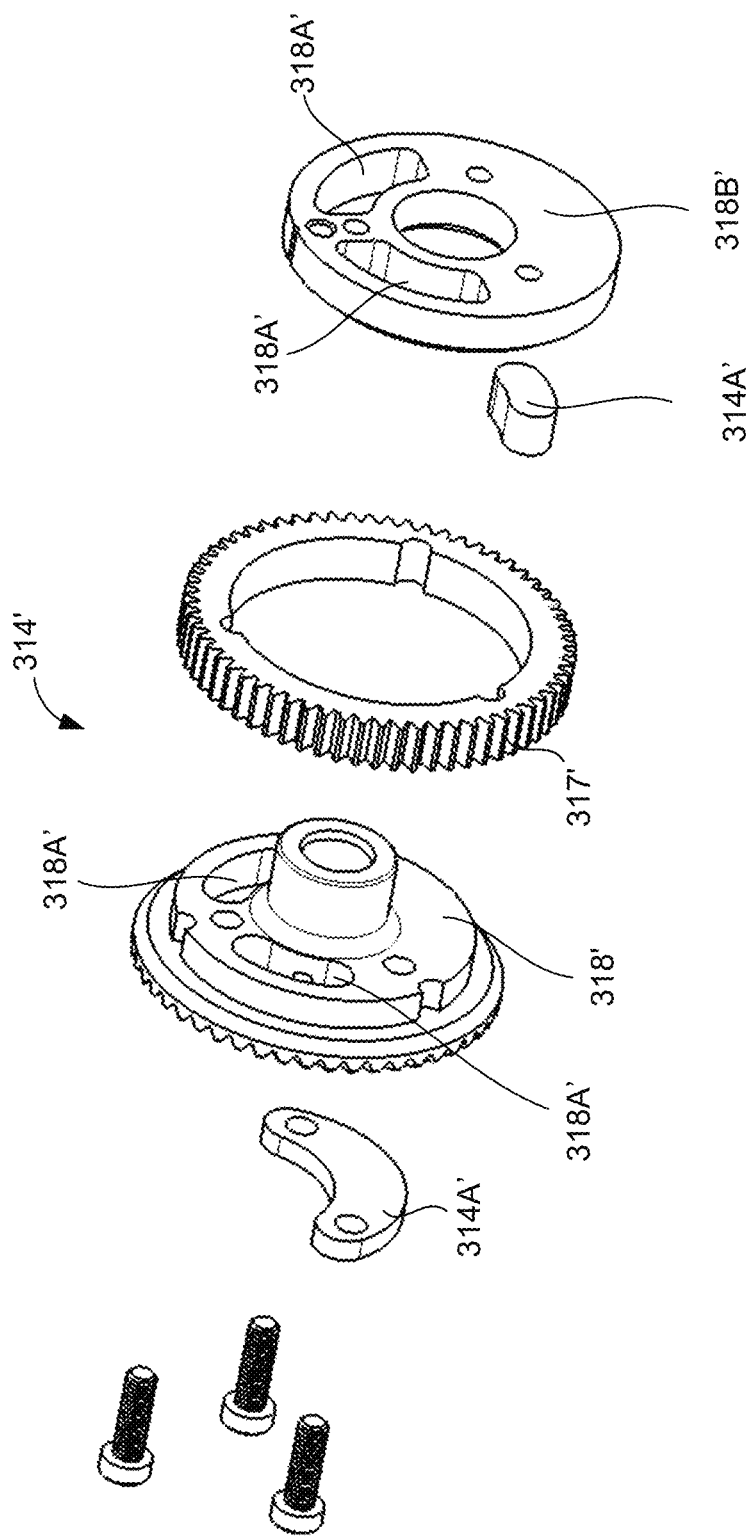
Figure 8D:
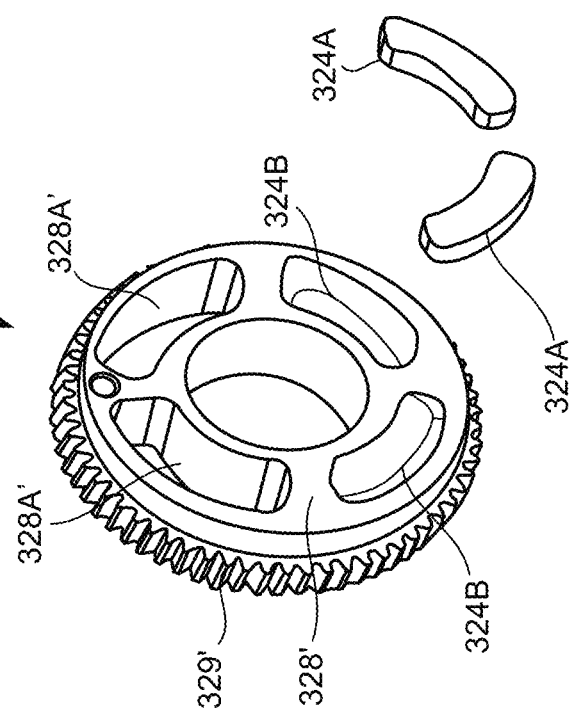
Figure 8C:
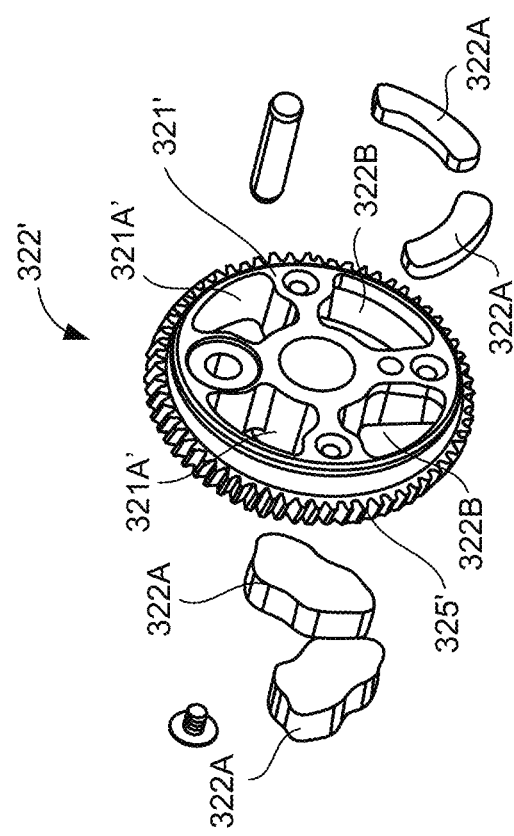

With reference to FIGS. 8A-8D, in an alternate embodiment, the transmission may include portions of material having a different density or mass than the majority of the gear assemblies. In some implementations, the counterweighting of the input and output gear assemblies may be achieved by removing a portion of the gear assembly (creating a recess or slot in the gear assembly) and by adding masses in one or more the recesses or slots of a material that has a different density than the other materials of the gear assembly. With reference to FIG. 8A, a first input gear 312' may be "weighted" by creating one or more recesses (also referred to as cutouts or slots). Specifically, the first input gear 312' may include two input gear plates 311'. The input gear plates 311' may include one or more recesses 311A' (similar to the recesses 311A noted above) and additional recesses 312B'. The additional or secondary recesses 312B' may be configured to receive discrete masses 312A'. The discrete masses 312A' may be of a material having a density different, typically but not necessarily greater than the density of the input gear plate 311'. As such, an offset counterweight can be established on the gear 312'. Additionally or alternatively, with reference to FIG. 8B, a second input gear 314' may be "weighted" by creating one or more recesses (also referred to as cutouts or slots). Specifically, the second input gear 314' may include two input gear plates 318'. The input gear plates 318' may include one or more recesses 318A' (similar to the recesses 318A noted above) and additional recesses 314B' (not shown in FIG. 8B but similar to recesses 312B' illustrated in FIG. 8A). The additional or secondary recesses 314B' may be configured to receive discrete masses 314A'. The discrete masses 314A' may be of a material having a density different, typically but not necessarily greater than the density of the input gear plate 318'. As such, an offset counterweight can be established on the gear 314'. With reference to FIG. 8C, additionally or alternately, a first output gear 322' may be "weighted" by creating one or more recesses (also referred to as cutouts or slots). Specifically, the first output gear 322' may include an output gear plate 321'. The output gear plate 321' may include one or more recesses 321A' (similar to the recesses 321A noted above) and additional recesses 322B. The additional or secondary recesses 322B may be configured to receive discrete masses 322A. The discrete masses 322A may be of a material having a density different, typically but not necessarily greater than the density of the input gear plate 321'. As such, an offset counterweight can be established on the gear 322'. With reference to FIG. 8D, additionally or alternatively, a second output gear 324' may be "weighted" by creating one or more recesses (also referred to as cutouts or slots). Specifically, the second output gear assembly 324' may include an input gear plate 328'. The output gear plate 328' may include one or more recesses 328A' (similar to the recesses 328A noted above) and additional recesses 324B. The additional or secondary recesses 324B may be configured to receive discrete masses 324A. The discrete masses 324A may be of a material having a density different, typically but not necessarily greater than the density of the input gear plate 328'. As such, an offset counterweight can be established on the gear assembly 324'.

FIG. 8A is an exploded perspective view of an alternate exemplary embodiment of a first input gear 312', including exemplary counterweight masses 312A' to be received in recesses 312B' formed in the first input gear plates 311' to provide for counterweighting of the first input gear 312'. FIG. 8B is an exploded perspective view of an alternate exemplary embodiment of a second input gear 314', including exemplary counterweight masses 314A' to be received in recesses 314B' formed in the second input gear plates 318' to provide for counterweighting of the second input gear 314'. FIG. 8C is an exploded perspective view of an alternate exemplary embodiment of a first output gear 322', including exemplary counterweight masses 322A to be received in recesses 322B formed in the first output gear plate 321' to provide for counterweighting of the first output gear 322'. FIG. 8D is an exploded perspective view of an alternate exemplary embodiment of a second output gear 324', including exemplary counterweight masses 324A to be received in recesses 324B formed in the second output gear plate 328' to provide for counterweighting of the second output gear 324'. In some implementations, a material of one or more of the counterweight masses 312A', 314A', 322A, 324A may be different from a material of the respective gear to which the counterweight mass is coupled. For example, in some implementations, the material of one or more of the counterweight masses 312A', 314A', 322A, 324A may be heavier, or more dense, than the material of the respective gear to which the counterweight mass is coupled, to achieve the counterweighting of the respective gear.

In some implementations, the counterweighting of the gears 312, 314, 322, 324 may be achieved by the removal of material due to the recesses (also referred to as slots or opening) 311A, 318A, 321A, 328A, formed in the gear plates 311, 318, 321, 328, providing counterweighting, and/or defining counterweights in the portions of the gears 312, 314, 322, 324 in which the recesses are not formed. In some implementations, a combination of these different types of counterweighting measures may be applied, within the input gear assembly 310 and/or the output gear assembly 320.

Relative positioning of the counter-rotating components of the input gear assembly 310 and the output gear assembly 320 during operation, and corresponding relative linear positioning of the reciprocating mechanism 230, as described above, is illustrated schematically in FIG. 9. In this schematic representation, a plan view of the first input gear 312 and a plan view of the second input gear 314 are shown, rather than the coaxially aligned position shown in FIGS. 5A-6D, simply for ease of discussion and illustration of the relative positioning of the counterweights 312A and 314A during the various phases of rotation of the input gear assembly 310. Similarly, in this schematic representation, a plan view of the first output gear 322 and a plan view of the second output gear 324 are shown, rather than the coaxially aligned position shown in FIGS. 5A, 5B and 7A-7D, simply for ease of discussion and illustration of the relative positioning of the counterweights 322A and 324A during the various phases of rotation of the output gear assembly 320. Further, the respective counterweight features of the first input gear 312, the second input gear 314, the first output gear 322 and the second output gear 324 are shown schematically in FIG. 9, simply for purposes of discussion and illustration. However, it is noted that, as described above, counterweighting of the respective input and output gears may be provided in different manners, such as, for example, added mass in the form of contouring of the respective gear plate, recesses formed in the respective gear plate to remove mass, weighted masses received in recesses formed in the respective gear plate, and/or a combination thereof.

Figure 9:
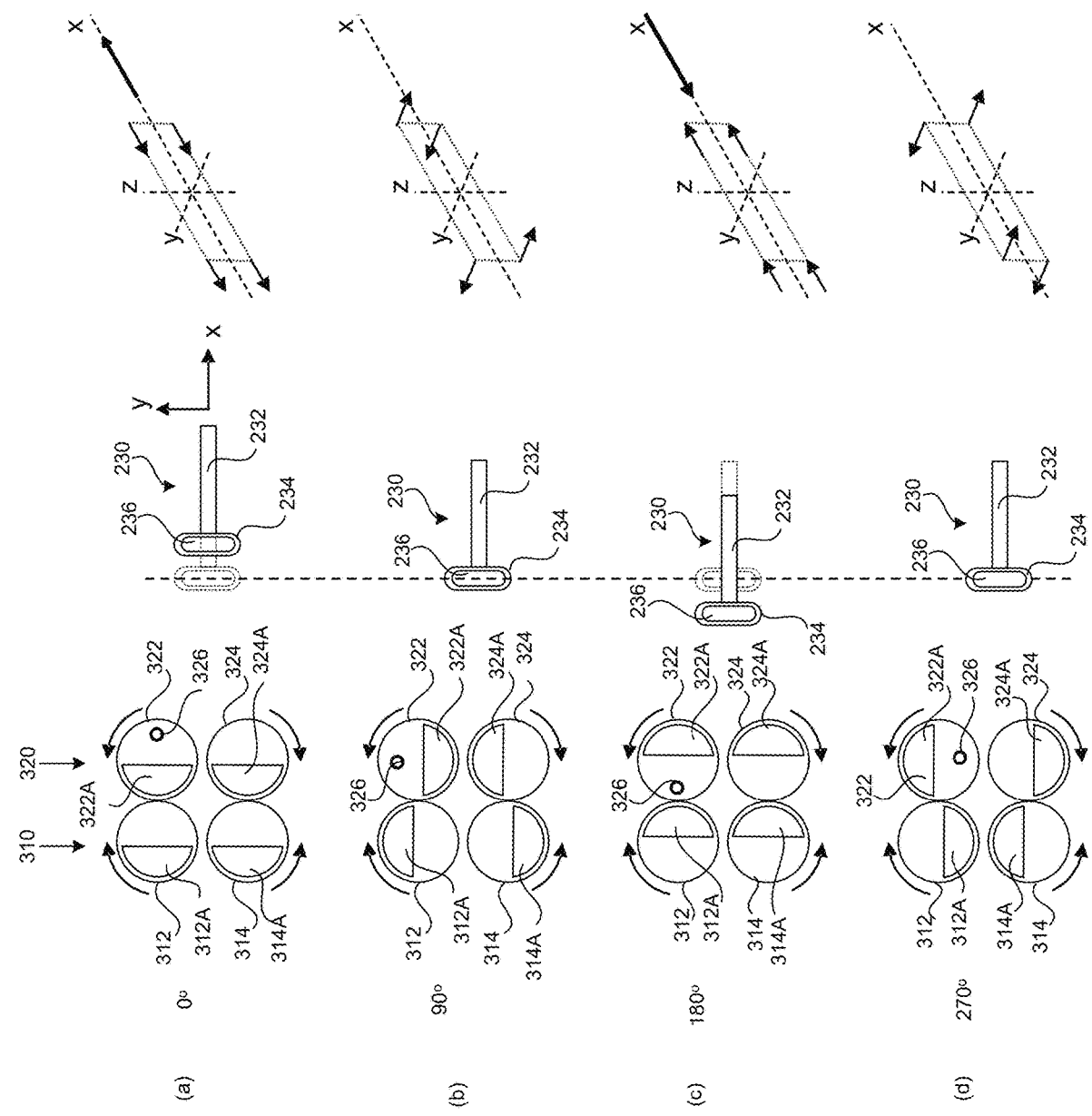
FIG. 9 schematically illustrates operation of the exemplary transmission and the exemplary reciprocating mechanism shown in FIGS. 5A-7D, in accordance with implementations described herein.
Figure 10A:
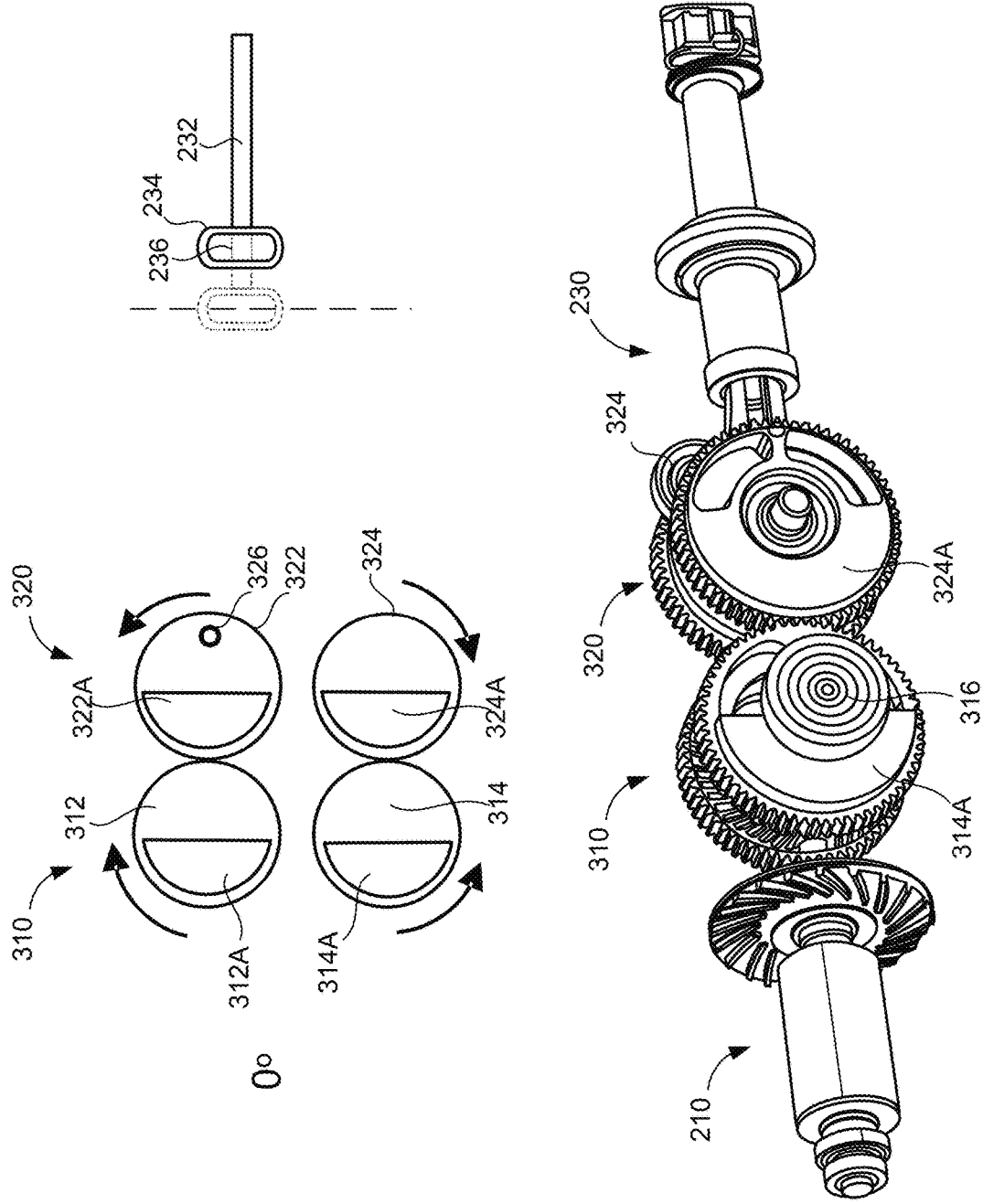
FIGS. 10A-10D further illustrate operation of the exemplary transmission and the exemplary reciprocating mechanism shown in FIGS. 5A-7D, in accordance with implementations described herein.
Figure 10B:
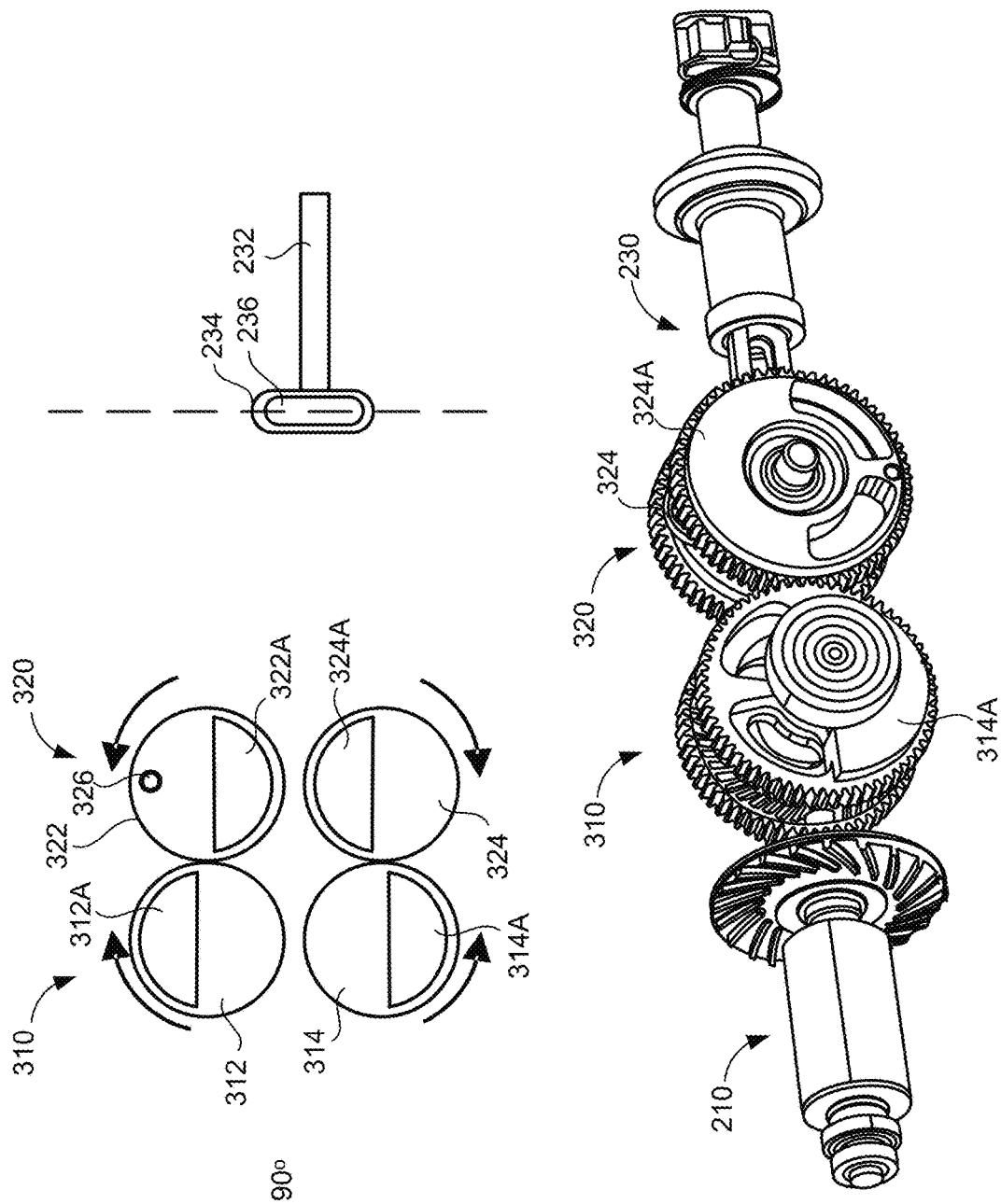
Figure 10C:
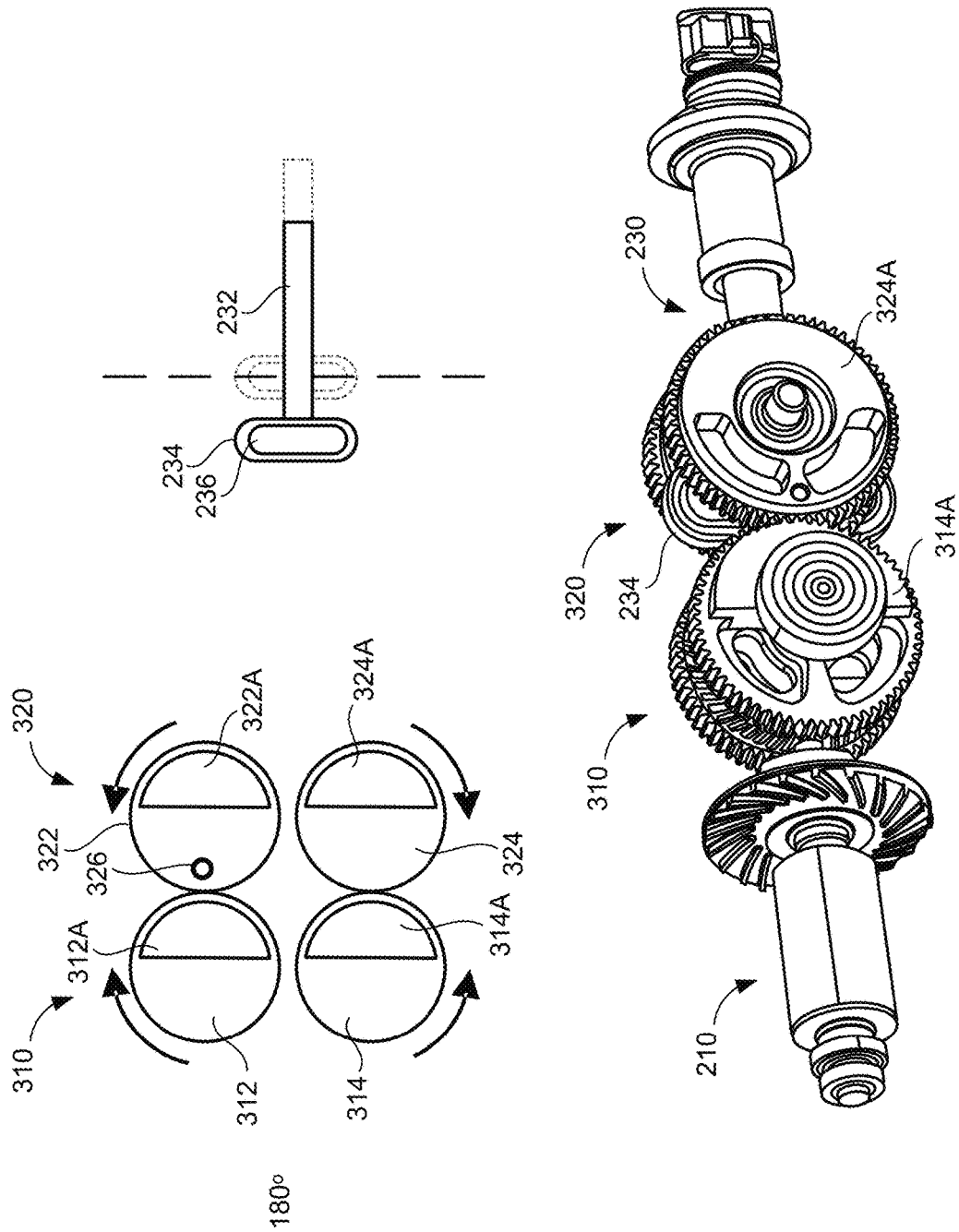
Figure 10D:
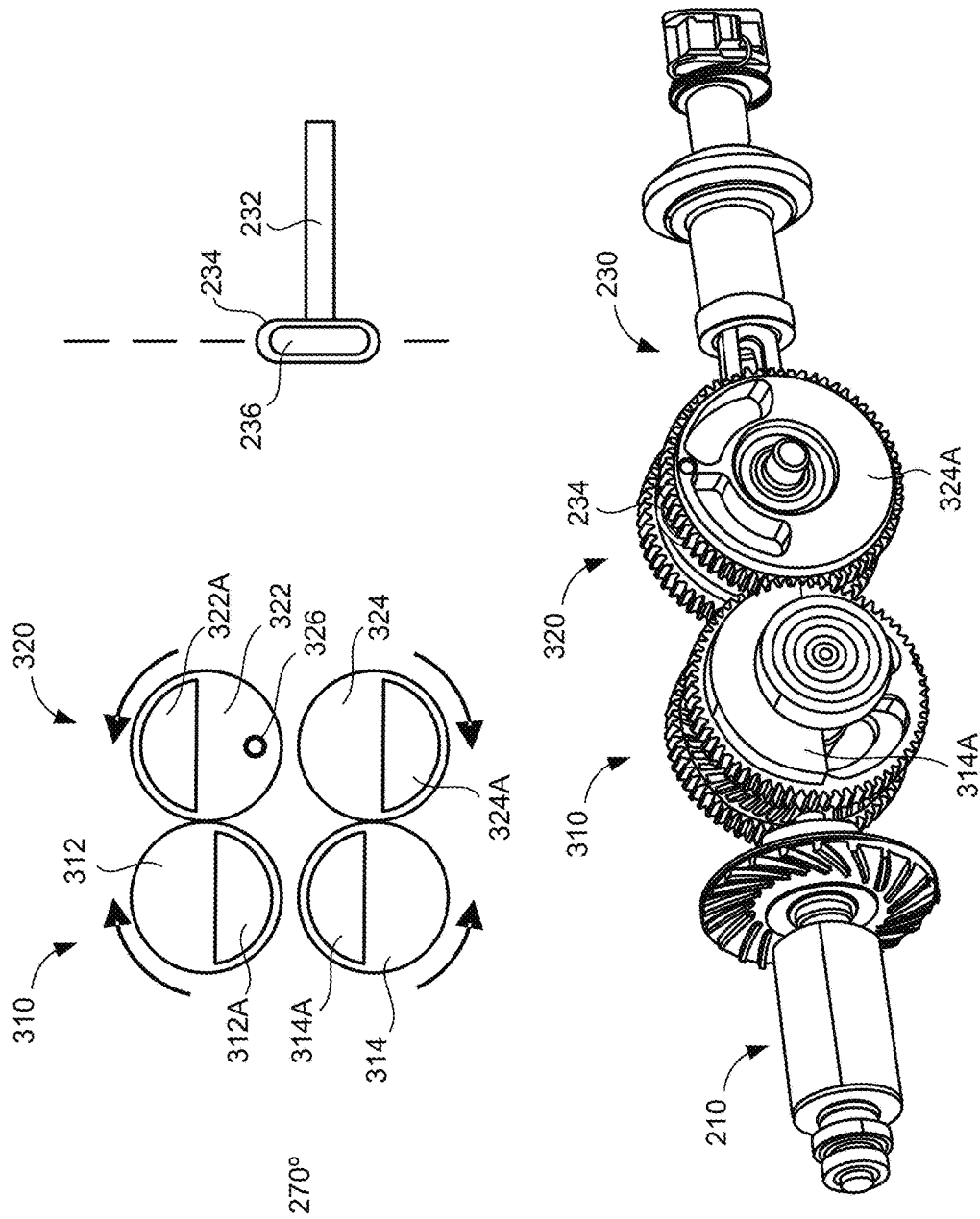

FIGS. 10A-10D provide more detailed views of the relative positioning of the counter-rotating components of the transmission 300, and corresponding relative linear positioning of the reciprocating mechanism 230. In particular, FIG. 10A illustrates the relative positioning of the counter-rotating components of the transmission 300, and corresponding relative linear positioning of the reciprocating mechanism 230 at a first extreme linear position of the spindle 232, together with the corresponding portion of the schematic illustration shown in FIG. 9. FIGS. 10B and 10D illustrate the relative positioning of the counter-rotating components of the transmission 300, and corresponding relative linear positioning of the reciprocating mechanism 230, at first and second intermediate positions of the spindle 232, together with the corresponding portions of the schematic illustration shown in FIG. 9. FIG. 10C illustrates the relative positioning of the counter-rotating components of the transmission 300, and corresponding relative linear positioning of the reciprocating mechanism 230 at a second extreme linear position of the spindle 232, together with the corresponding portion of the schematic illustration shown in FIG. 9.

As shown in FIGS. 9, 10A and 10C, the 0° position and the 180° position represent (opposite) extremes of travel of the spindle 232 of the reciprocating mechanism 230. At these extremes, all of the counterweights, or counterweight masses, 312A, 314A, 322A and 324A, are in phase along the X-axis of operation. The sum of the forces generated by the counterweights 312A, 314A, 322A, and 324A substantially counteract the inertial forces generated due to movement and positioning of the spindle 232. The 90° position and the 270° position, shown in FIGS. 9, 10B and 10D, illustrate two exemplary intermediate positions between the extremes of travel of the spindle 232. At these intermediate positions, all of the counterweights, or counterweight masses, 312A, 314A, 322A and 324A, are oriented substantially perpendicular to the X-axis of operation. The sum of the forces generated by the counterweights 312A and 324A are counteracted by the sum of the forces generated by the counterweights 314A and 322A, which are substantially equal in magnitude but opposite in direction. The positioning of the counterweights, or counterweight masses, 312A, 314A, 322A and 324A, are paired, such that the moment generated by any two of the counterweights, or counterweight masses, are counteracted by a substantially equal and opposite moment generated by the other two of the counterweights, or counterweight masses.

As shown, for example, in FIG. 9(b), the pair of forces generated by the counterweights 312A and 322A may form a first couple moment that would tend to cause rotation about the (−Z) axis. This first couple moment is counteracted by a second couple moment formed by the pair of forces generated by the counterweights 314A and 324A that is substantially equal in magnitude to the first couple moment but opposite in direction. Concurrently, in the orientation illustrated in FIG. 9(d), the pair of forces generated by the counterweights 312A and 314A form a third couple moment that would tend to cause rotation about the (−X) axis. This third couple moment is counteracted by a fourth couple moment formed by the pair of forces generated by the counterweights 322A and 324A that is substantially equal in magnitude to the third couple moment but opposite in direction.

Figure 11:
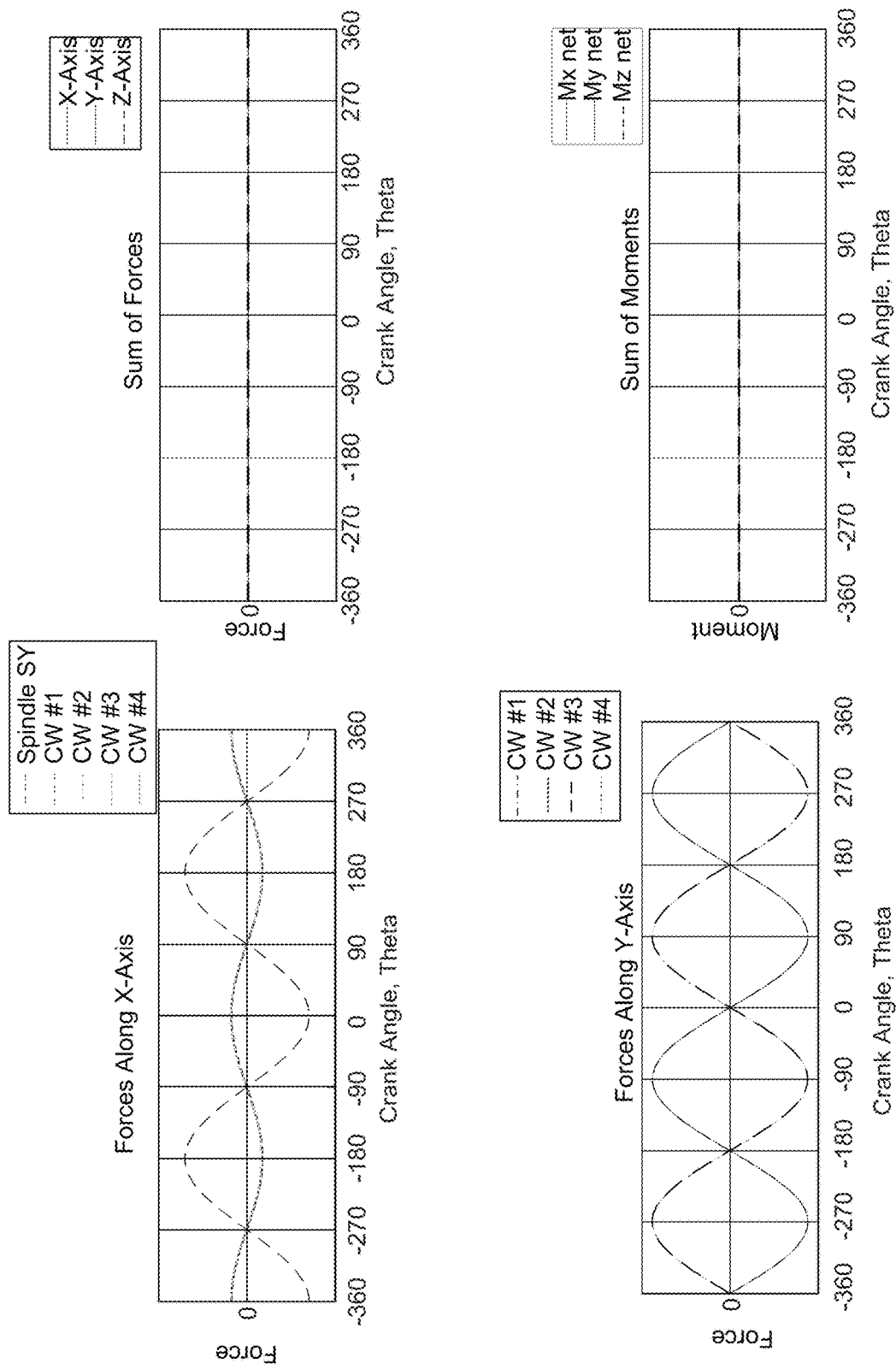
FIG. 11 graphically illustrates the balancing of forces and moments in an exemplary tool including the exemplary driving system shown in FIGS. 4-10D, in accordance with implementations described herein.

In this manner, substantially all of the internal forces and/or moments, generated by the operation of the motor 210, the rotation of the transmission 300, and the linear movement of the spindle 232, may be balanced. The balancing of these forces and/or moments may result in essentially no net force, in the form of, for example, vibration, transferred from the tool to the operator of the tool. The balancing of these forces and/or moments, described above with respect to FIGS. 9-10D, is graphically illustrated in FIG. 11.

In some implementations, components of a transmission mechanism and an output mechanism for a power-driven reciprocating tool may be arranged differently than described above, to achieve the desired counterbalancing of the forces and/or moments generated during operation of a tool including a reciprocating mechanism, to thus reduce or substantially eliminate vibration of the tool. For example, in some implementations, a transmission mechanism, in accordance with implementations described herein, may include a co-planar arrangement of four counter-rotating elements, a coaxial arrangement of four counter-rotating elements, and the like.

Figure 12:
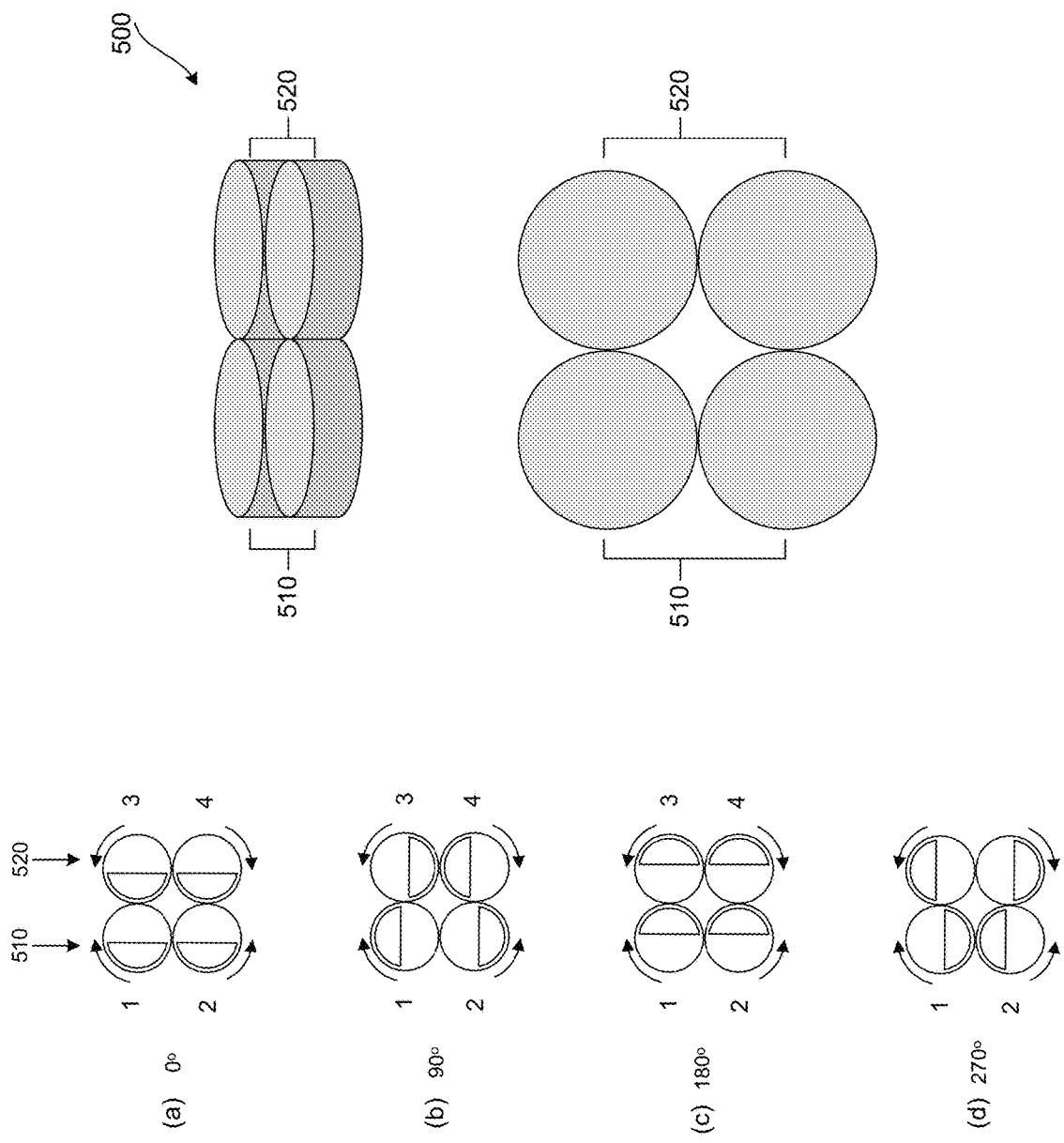
FIG. 12 is a schematic diagram of an alternate exemplary transmission, in accordance with implementations described herein.

FIG. 12 is a schematic diagram of an exemplary co-planar arrangement of four counter-rotating elements of an exemplary transmission 500, in accordance with implementations described herein. In this exemplary implementation, the transmission 500 may include a driving gear assembly 510 (also referred to as an input gear assembly 510), and a driven gear assembly 520 (also referred to as an output gear assembly 520). In some implementations, the input gear assembly 510 may be engaged with a motor via a motor output shaft (not shown in FIG. 12), for example, as described in detail above, to receive and transmit a driving force from the motor to a reciprocating mechanism (not shown in FIG. 12). In some implementations, individual gears of the input gear assembly 510 and/or the output gear assembly 520 may be driven by a respective motor to achieve the desired counter-rotation. In some implementations, the transmission 500 may be belt driven to transmit rotational force between the input and output gear assemblies 510, 520 and achieve the desired counter-rotation. In some implementations, the transmission 500 may include idler gears to transmit rotational force between the input and output gear assemblies 510, 520 and achieve the desired counter-rotation. In an arrangement in which a belt or an idler gear provides for independent reversing of rotational direction, a single motor could be engaged with any one of the four counter-rotating elements to achieve the desired counterbalancing, and also adapt a form, or profile of the transmission to a form factor of the tool and surrounding internal components of the tool.

Figure 13:
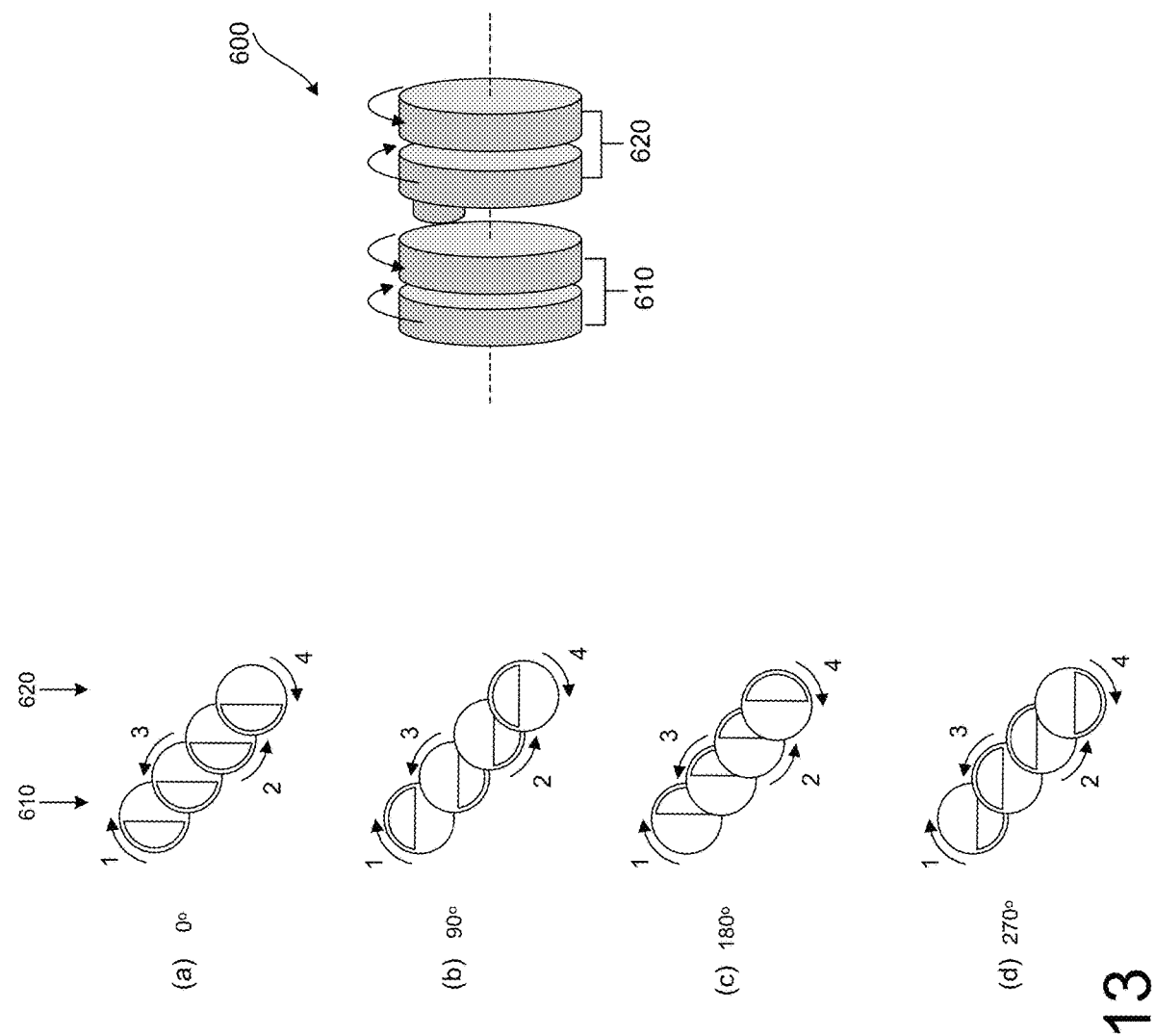
FIG. 13 is a schematic diagram of an alternate exemplary transmission, in accordance with implementations described herein.

FIG. 13 is a schematic diagram of an exemplary coaxial arrangement of four counter-rotating elements of an exemplary transmission 600, in accordance with implementations described herein. In this exemplary implementation, the transmission 600 may include a driving gear assembly 610 (also referred to as an input gear assembly 610), and a driven gear assembly 620 (also referred to as an output gear assembly 620). In some implementations, the input gear assembly 610 may be engaged with a motor via a motor output shaft (not shown in FIG. 13), for example, as described in detail above, to receive and transmit a driving force from the motor to a reciprocating mechanism (not shown in FIG. 13). In some implementations, individual gears of the input gear assembly 610 and/or the output gear assembly 620 may be driven by a respective motor to achieve the desired counter-rotation. In some implementations, the transmission 600 may be belt driven to transmit rotational force between the input and output gear assemblies 610, 620 and achieve the desired counter-rotation. In some implementations, the transmission 600 may include idler gears to transmit rotational force between the input and output gear assemblies 610, 620 and achieve the desired counter-rotation. In an arrangement in which a belt or an idler gear provides for independent reversing of rotational direction, a single motor could be engaged with any one of the four counter-rotating elements to achieve the desired counterbalancing, and also adapt a form, or profile of the transmission to a form factor of the tool and surrounding internal components of the tool.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A reciprocating tool, comprising:
   a housing;
   a motor received in the housing;
   a reciprocating mechanism reciprocally coupled in the housing and configured to reciprocate along a first axis of operation; and
   a transmission received in the housing, wherein the transmission includes:
      a counterweighted input gear assembly engaged with an output shaft of the motor, the output shaft being arranged in parallel with the first axis of operation, including:
         a first shaft aligned with a second axis of operation that is substantially orthogonal to the first axis of operation;
         a first input gear arranged on the first shaft; and
         a second input gear arranged on the first shaft such that the first input gear, the first shaft and the second input gear are concentrically arranged; and
      a counterweighted output gear assembly engaged with the counterweighted input gear assembly, and engaged with the reciprocating mechanism, so as to transfer a force generated by the motor to the reciprocating mechanism, the counterweighted output gear assembly including:
         a second shaft arranged in parallel with the second axis of operation;
         a first output gear arranged on the second shaft; and
         a second output gear arranged on the second shaft such that the first output gear, the second shaft and the second output gear are concentrically arranged, wherein the counterweighted input gear assembly and the counterweighted output gear assembly are configured to operate to dynamically balance forces generated about the first axis of operation and the second axis of operation, the reciprocating mechanism being configured to convert a rotational force, generated by the motor and transferred thereto by the transmission, to a reciprocating linear force output by the reciprocating mechanism.

2. The tool of claim 1, wherein the counterweighted input gear assembly includes:
a first counterweight feature provided on the first input gear; and
a second counterweight feature provided on the second input gear.

3. The tool of claim 2, wherein the first counterweight feature and the second counterweight feature are each defined by at least one of:
an enlarged portion of the respective input gear such that a weight of the enlarged portion of the respective input gear is greater than a weight of a remaining portion of the respective input gear;
at least one counterweight mass received in a corresponding recessed portion of the respective input gear, such that a weight of the recessed portion of the respective input gear is greater than a weight of a remaining portion of the respective input gear; or
one or more slots defined in a slotted portion of the respective input gear, such that a weight of the slotted portion of the respective input gear is less than a weight of a remaining portion of the respective input gear.

4. The tool of claim 2, wherein
the first output gear is in meshed engagement with the first input gear; and
the second output gear is in meshed engagement with the second input gear,
the output gear assembly also including:
a pin eccentrically mounted on a gear plate of one of the first output gear or the second output gear, wherein the reciprocating mechanism is coupled to the pin;
a third counterweight feature provided on the first output gear; and
a fourth counterweight feature provided on the second output gear.

5. The tool of claim 4, wherein the third counterweight feature and the fourth counterweight feature are each defined by at least one of:
an enlarged portion of the respective output gear, such that a weight of the enlarged portion of the respective output gear is greater than a weight of a remaining portion of the respective output gear;
at least one counterweight mass received in a corresponding recessed portion of the respective output gear, such that a weight of the recessed portion of the respective output gear is greater than a weight of a remaining portion of the respective output gear; or
one or more slots defined in a slotted portion of the respective output gear, such that a weight of the slotted portion of the respective output gear is less than a weight of a remaining portion of the respective output gear.

6. The tool of claim 4, wherein, in response to rotation of the output shaft of the motor,
the first input gear rotates in a first direction;
the second input gear rotates in a second direction, opposite the first direction;
the first output gear rotates in the second direction; and
the second output gear rotates in the first direction.

7. The tool of claim 6, wherein a spindle of the reciprocating mechanism linearly between a first end position of the spindle and a second end position of the spindle along the first axis of operation in response to the rotation of the first input gear, the second input gear, the first output gear and the second output gear, and
wherein the first counterweight feature, the second counterweight feature, the third counterweight feature and the fourth counterweight feature are all positioned in phase and substantially aligned with the first axis of operation when the spindle is at the first end position, and when the spindle is at the second end position along the first axis of operation.

8. The tool of claim 1, wherein the counterweighted input gear assembly includes a first counterweight and a second counterweight and the counterweighted output gear assembly includes a third counterweight and a fourth counterweight that are all aligned with the second axis of operation when a spindle of the reciprocating mechanism is at an intermediate position along the first axis of operation, between a first end position and a second end position of the first axis of operation.

9. The tool of claim 8, wherein, at the intermediate position of the spindle, a moment about the first axis of operation generated by rotational positions of two of the first counterweight, the second counterweight, the third counterweight and the fourth counterweight, is balanced by an equal and opposite moment generated by rotational positions of the remaining two of the first counterweight, the second counterweight, the third counterweight and the fourth counterweight.

10. The tool of claim 8, wherein, at the intermediate position of the spindle, forces and moments about the first axis of operation, the second axis of operation, and a third axis of operation generated by rotational positions of any coaxial or coplanar pair of the first counterweight, the second counterweight, the third counterweight, and the fourth counterweight, are balanced by equal and opposite forces and moments generated by the remaining coaxial or coplanar pair of the first counterweight, the second counterweight, the third counterweight, and the fourth counterweight.

11. The tool of claim 4, wherein the reciprocating mechanism includes:
a spindle;
a blade at a first end portion of the spindle; and
a slot formed in the blade, wherein the pin of the output gear assembly is movably received in the slot, to couple the transmission and the reciprocating mechanism, such that rotation of the output gear assembly is converted into linear movement of the reciprocating mechanism.

12. The tool of claim 4, wherein the input gear assembly includes:
a first outer gear on an outer circumferential surface of the first input gear;
a first bevel gear on an inner face of the first input gear, facing the second input gear;
a second outer gear on an outer circumferential surface of the second input gear; and
a second bevel gear on an inner face of the second input gear, facing the first input gear.

13. The tool of claim 12, wherein the first bevel gear and the second bevel gear are in meshed engagement with a pinion gear on the output shaft of the motor, such that, in response to rotation of the pinion gear of the motor, the first input gear rotates in a first direction, and the second input gear rotates in a second direction.

14. The tool of claim 13, wherein the output gear assembly includes:
- a third outer gear on an outer circumferential surface of the first output gear, in meshed engagement with the first outer gear of the first input gear; and
- a fourth outer gear on an outer circumferential surface of the second output gear, in meshed engagement with the second outer gear of the second input gear,
- wherein, in response to rotation of the first input gear in the first direction, the first output gear rotates in the second direction, and
- in response to rotation of the second input gear in the second direction, the second output gear rotates in the first direction.

15. A transmission for a power-driven reciprocating tool, the transmission comprising:
- a counterweighted input gear assembly configured to be coupled to an output shaft of a motor; and
- a counterweighted output gear assembly engaged with the input gear assembly and configured to be coupled to a reciprocating mechanism operable along a first axis of operation, wherein
- the counterweighted input gear assembly includes:
  - a first shaft arranged in parallel with a second axis of operation that is substantially orthogonal to the first axis of operation;
  - a first input gear mounted on the first shaft; and
  - a second input gear mounted on the first shaft such that the first input gear, the first shaft and the second input gear are concentrically arranged; and
- the counterweighted output gear assembly includes:
  - a second shaft arranged in parallel with the second axis of operation;
  - a first output gear mounted on the second shaft; and
  - a second output gear mounted on the second shaft such that the first output gear, the second shaft, and the second output gear are concentrically arranged, wherein the input gear assembly and the output gear assembly are configured to operate to dynamically balance forces generated about the first axis of operation and the second axis of operation.

16. The transmission of claim 15, wherein
the counterweighted input gear assembly includes:
- a first counterweight feature provided on the first input gear; and
- a second counterweight feature provided on the second input gear; and
the counterweighted output gear assembly includes:
- a third counterweight feature provided on the first output gear; and
- a fourth counterweight feature provided on the second output gear.

17. The transmission of claim 16, wherein the first counterweight feature, the second counterweight feature, the third counterweight feature and the fourth counterweight feature are each defined by at least one of:
- an enlarged portion of the respective input gear such that a weight of the enlarged portion of the respective input gear is greater than a weight of a remaining portion of the respective input gear;
- at least one counterweight mass received in a corresponding recessed portion of the respective input gear, such that a weight of the recessed portion of the respective input gear is greater than a weight of a remaining portion of the respective input gear; or
- one or more slots defined in a slotted portion of the respective input gear, such that a weight of the slotted portion of the respective input gear is less than a weight of a remaining portion of the respective input gear.

18. The transmission of claim 16, wherein the first counterweight feature, the second counterweight feature, the third counterweight feature and the fourth counterweight feature are configured to be positioned in phase and substantially aligned with the first axis of operation in response to positioning of the reciprocating mechanism a first end position along the first axis of operation and in response to positioning of the reciprocating mechanism at a second end position along the first axis of operation.

19. The transmission of claim 18, wherein a moment about the first axis of operation generated by rotational positions of two of the first counterweight feature, the second counterweight feature, the third counterweight feature and the fourth counterweight feature, is balanced by an equal and opposite moment generated by rotational positions of the remaining two of the first counterweight feature, the second counterweight feature, the third counterweight feature and the fourth counterweight feature in response to positioning of the reciprocating mechanism an at intermediate position along the first axis of operation.

20. The transmission of claim 15, wherein
the counterweighted input gear assembly includes:
- a first outer gear on an outer circumferential surface of the first input gear;
- a first bevel gear on an inner face of the first input gear, facing the second input gear, wherein the first and second bevel gears are configured to mesh with a pinion gear on the output shaft of the motor;
- a second outer gear on an outer circumferential surface of the second input gear; and
- a second bevel gear on an inner face of the second input gear, facing the first input gear; and
the counterweighted output gear assembly includes:
- a third outer gear on an outer circumferential surface of the first output gear; and
- a fourth outer gear on an outer circumferential surface of the second output gear, wherein
the first output gear is in meshed engagement with the first input gear; and
the second output gear is in meshed engagement with the second input gear, such that, in response to rotation of the output shaft of the motor,
the first input gear rotates in a first direction;
the second input gear rotates in a second direction, opposite the first direction;
the first output gear rotates in the second direction; and
the second output gear rotates in the first direction.

* * * * *

UNITED STATES PATENT AND TRADEMARK OFFICE
CERTIFICATE OF CORRECTION

PATENT NO. : 11,229,963 B2
APPLICATION NO. : 16/450504
DATED : January 25, 2022
INVENTOR(S) : Mougeotte et al.

Page 1 of 1

It is certified that error appears in the above-identified patent and that said Letters Patent is hereby corrected as shown below:

On the Title Page

Column 1, item (72), in "Inventors", Line 2, delete "Reistertown" and insert -- Reisterstown --, therefor.

In the Claims

In Column 18, Claim 18, Line 16, insert -- at -- before "a first".

In Column 18, Claim 19, Line 30, delete "an at" and insert -- at an --, therefor.

Signed and Sealed this
Sixteenth Day of August, 2022

Katherine Kelly Vidal
*Director of the United States Patent and Trademark Office*